(12) United States Patent
Rixner et al.

(10) Patent No.: US 8,761,152 B2
(45) Date of Patent: Jun. 24, 2014

(54) METHOD AND SYSTEM FOR SCALABLE ETHERNET

(75) Inventors: Scott Rixner, Houston, TX (US); Alan L. Cox, Houston, TX (US); Michael Foss, Houston, TX (US); Jeffrey Shafer, Houston, TX (US)

(73) Assignee: William Marsh Rice University, Houston, TX (US)

( * ) Notice: Subject to any disclaimer, the term of this patent is extended or adjusted under 35 U.S.C. 154(b) by 924 days.

(21) Appl. No.: 12/578,240

(22) Filed: Oct. 13, 2009

(65) Prior Publication Data

US 2010/0095020 A1   Apr. 15, 2010

Related U.S. Application Data

(60) Provisional application No. 61/105,360, filed on Oct. 14, 2008.

(51) Int. Cl.
*H04L 12/28* (2006.01)

(52) U.S. Cl.
USPC ........... 370/351; 370/389; 370/392; 370/401; 370/395.53

(58) Field of Classification Search
None
See application file for complete search history.

(56) References Cited

U.S. PATENT DOCUMENTS

| 7,596,693 B1* | 9/2009 | Caves et al. .................... 713/161 |
| 2008/0195700 A1* | 8/2008 | Jonsson ........................ 709/203 |
| 2009/0043911 A1* | 2/2009 | Flammer et al. .............. 709/238 |

OTHER PUBLICATIONS

M. Caesar, M. Castro, E. B. Nightingale, G. O'Shea, and A. Rowstron; "Virtual Ring Routing: Network Routing Inspired by DHTs"; In Proceedings of ACM SIGCOMM; Sep. 11-15, 2006 (12 Pages).
M. Caesar, T. Condie, J. Kannan, K. Lakshminarayanan, I. Stoica, and S. Shenker; "ROFL: Routing on Flat Labels"; In Proceedings of ACM SIGCOMM; Sep. 11-15, 2006 (12 Pages).
B. Ford; "Unmanaged Internet Protocol: Taming the Edge Network Management Crisis"; Nov. 2003 (6 Pages).
J. Katcher; "PostMark: A New File System Benchmark"; Technical Report TR3022, Network Appliance, Oct. 1997 (8 Pages).
C. Kim, M. Caesar, and J. Rexford; "Floodless in Seattle: A Scalable Ethernet Architecture for Large Enterprises"; In Proceedings of ACM SIGCOMM; Aug. 17-22, 2008 (12 Pages).
C. Kim, and J. Rexford; Revisiting Ethernet: Plug-and-play made scalable and efficient; In IEEE LANMAN; Jun. 2007 (7 Pages).

(Continued)

*Primary Examiner* — Faruk Hamza
*Assistant Examiner* — Tito Pham
(74) *Attorney, Agent, or Firm* — Osha Liang LLP

(57) ABSTRACT

A computer readable medium comprising computer readable code for data transfer. The computer readable code, when executed, performs a method. The method includes receiving, at a first Axon, an ARP request from a source host directed to a target host. The method also includes obtaining a first route from the first Axon to the second Axon, and generating a target identification corresponding to the target host. The method further includes sending an Axon-ARP request to the second Axon using the first route, and receiving an Axon-ARP reply from the second Axon, where the Axon-ARP reply includes a second route. The method further includes storing the first route in storage space on the first Axon, where the storage space is indexed by the target identification, and sending an ARP reply to the first host where the source host is configured to send a packet to the target host.

16 Claims, 15 Drawing Sheets

(56) References Cited

OTHER PUBLICATIONS

J.W. Lockwood, N. McKeown, G. Watson, G. Gibb, P. Hartke, J. Naous, R. Raghuraman, and J. Luo. NetFPGA-an open platform for gigabit-rate network switching and routing. In IEEE International Conference on Microelectronic Systems Education (MSE'2007, Jun. 2007).
N. McKeown, T. Anderson, H. Balakrishnan, G. Parulkar, L. Peterson, J. Rexford, S. Shenker, and J. Turner. Openflow. Enabling innovation in campus networks. SIGCOMM Comput. Commun. Rev., 38(2):69-74, 2008.
A. Meyers, T. S. E. Ng, and H. Zhang. Rethinking the service model: Scaling Ethernet to a million nodes. In HotNets, Nov. 2004.
Myricom. Myri-10G NICs and software, Aug. 2008. Product brief.
F.D. Pellegrini, D. Starobinski, M. G. Karpovsky, and L. Levitin. Scalable cycle-breaking algorithms for gigabit Ethernet backbones. In Proceedings of IEEE Infocom, Mar. 2004.
R. Perlman. Rbridges: Transparent routing. In Proceedings of IEEE Infocom, Mar. 2004.
S. Ray, R. A. Guerin, and R. Sofia. A distributed hash table based address resolution scheme for large-scale Ethernet networks. In International Conference on Communications, Jun. 2007.
J. Rexford, A. A Greenberg, G. Hjalmtysso, D. Maltz, A. Myers, G. Xie, J. Zhan, and H. Zhang. Network-wide decision making: Toward a wafer-thin control plane. in HotNets, Nov. 2004.
T. L. Rodeheffer, C. A. Thekkath, and D. C. Anderson. SmartBridge: a scalable bridge architecture. In Proceedings of ACM SGCOMM, Aug. 2000.
S. Sharma, K. Gopalan, S. Nanda, and T. Chiueh. Viking: A multi-spanning-tree Ethernet architecture for metropolitan area and cluster networks. In Proceedings of IEEE Infocom, Mar. 2004.
H. Yan, D. A. Maltz, T. S. E. Ng, H. Gogineni, H. Zhang, and Z. Cai. Tesseract: A 4D network control plane. In Proceedings of the Symposium on Network Systems Design and Implementation, Apr. 2007.
Chuanxiong Guo, Guohan Lu, Dan Li, Haitao Wu, Xuan Zhang, Yunfeng Shi, Chen Tian, Yongguang Zhang, Songwu Lu. BCube: A High Performance, Server-centric Network Architecture for Modular Data Centers. Sigcomm, Aug. 2009. (12 pages).
Manoj Wadekar, Intel Corporation. Enhanced Ethernet for Data Center: Reliable, Channelized and Robust. In proceedings of the 2007 15th IEEE Workshop. (7 pages).
Albert Greenberg, Parantap Lahiri, David A. Maltz, Parveen Patel, Sudipta Sengupta. Towards a Next Generation Data Center Architecture: Scalability and Commoditization. Aug. 22, 2008. (6 pages).
Radhika Niranjan Mysore, Andreas Pamboris, Nathan Farrington, Nelson Huang, Pardis Miri, Sivasankar Radhakrishnan, Vikram Subramanya, and Amin Vandat. PortLand: A Scalable Fault-Tolerant Layer 2 Data Center Network Fabric. In proceedings of SIGCOMM. Aug. 2009. (12 pages).
Albert Greenberg, James R. Hamilton, Navendu Jain, Srikanth Kanula, Changhoon Kim, Parantap Lahri, David A. Maltz, Parveen patel, Sudpta Sengupta. VL2: A Scalable and Flexible Data Center Network. In proceedings og SIGCOMM. Aug. 2009. (12 pages).
Yi Wang, Eric Keller, Brian Biskeborn, Jacobus van der Merwe, Jennifer Rexford. Virtual Routers on the Move: Live Router Migration as a Network-Management Primitive. In proceeding of SIGCOMM. Aug. 2008. (12 pages).

* cited by examiner

METHOD AND SYSTEM FOR SCALABLE ETHERNET

CROSS-REFERENCE TO RELATED APPLICATIONS

This application claims priority under 35 U.S.C. §119(e) to U.S. Provisional Patent Application No. 61/105,360 entitled "Method and System for Scalable Ethernet," filed on Oct. 14, 2008 in the names of Scott Rixner, Alan L. Cox, Michael Foss, and Jeffrey Shafer, which is hereby incorporated by reference in its entirety.

STATEMENT REGARDING FEDERALLY SPONSORED RESEARCH OR DEVELOPMENT

This invention was made with Government Support under contracts CCF-0546140 and CCF-0720878 awarded by the National Science Foundation. The United States Government has certain rights in this invention.

BACKGROUND

Ethernet interfaces are standard equipment in a wide range of computer systems, from embedded devices to mainframes. Moreover, switched Ethernet is deployed in a variety of environments, including home networks, office networks, data center networks, and campus networks. A key reason for switched Ethernet's wide-spread deployment is its ease of operation. First, Ethernet equipment will operate with little or no manual configuration. Second, switched Ethernet is self healing (e.g., it can automatically take advantage of redundant network connectivity to recover from network failures).

Switched Ethernet's ease of operation is derived in large part from its ability to flood packets throughout the network. Specifically, flooding enables a packet to reach the destination host's interface without any configuration of that interface or the network, regardless of the interface's location in the network topology. However, because Ethernet packets do not have a time-to-live field, the network topology must not have any cycles. Otherwise flooded packets will circulate endlessly inside the network cycles.

SUMMARY

In general, in one aspect, the invention relates to a computer readable medium comprising computer readable code for data transfer. The computer readable code, when executed, performs a method. The method includes receiving, at a first Axon, an ARP request from a source host directed to a target host, where the source host and the first Axon are operatively connected. The method also includes obtaining a first route from the first Axon to the second Axon, where the second Axon is operatively connected to the target host, and generating a target identification corresponding to the target host. The method further includes sending an Axon-ARP request to the second Axon using the first route, where the second Axon is configured to generate a source identification, and receiving an Axon-ARP reply from the second Axon, where the Axon-ARP reply includes a second route, where the second route includes a route from the second Axon to the first Axon. The method further includes storing the first route and a target MAC address in storage space on the first Axon, where the storage space is indexed by the target identification, where the target MAC address is associated with the target host, and sending an ARP reply to the first host where the source host is configured to send a packet to the target host.

In general, in one aspect, the invention relates to a computer readable medium comprising computer readable code for data transfer. The computer readable code, when executed, performs a method. The method includes receiving a first Ethernet packet from a source host at a first Axon, where the first Ethernet packet includes a first destination, a first source, and data, where the first source is a source MAC address associated with the source host. The first Axon comprises a route entry, where the route entry is indexed by a target identification associated with the target host. The route entry includes a route from the first Axon to a second Axon. The method further includes obtaining the route from the first Axon to the second Axon, where the second Axon is operatively connected to the target host. The method further includes generating an Axon packet, and sending the Axon packet to the second Axon using the route.

In general, in one aspect, the invention relates to an Axon. The Axon includes a processor, a route lookup module, and a header processor module. The route lookup module is configured to receive an Ethernet packet from a source host directed toward a target host, where the Ethernet packet includes a first destination, a first source, and data. The first source is a source MAC address associated with the source host. The route lookup module is further configured to obtain a route from the Axon to a second Axon using the first destination, where the second Axon is operatively connected to the target host, the route is stored in a route entry, and the route entry is indexed by a target identification associated with the target host. The route lookup module is further configured to generate an Axon packet using the route and the Ethernet packet. The header processor module is configured to receive the Axon packet, determine a next forward hop using the route, and determine whether an output port identified by the next forward hop is connected to the target host. When the output port identified by the next forward hop is connected to the target host, the header processor module is configured to extract the Ethernet packet from the Axon packet, and send the Ethernet packet to the target host. When the output port identified by the next forward hop is connected to an intermediate Axon interposed between the Axon and the second Axon, the header processor module is configured to update the route in the Axon packet to obtain an updated Axon packet, and send the updated Axon packet, via the switch in the Axon, to the output port.

DETAILED DESCRIPTION

Figure 1A:
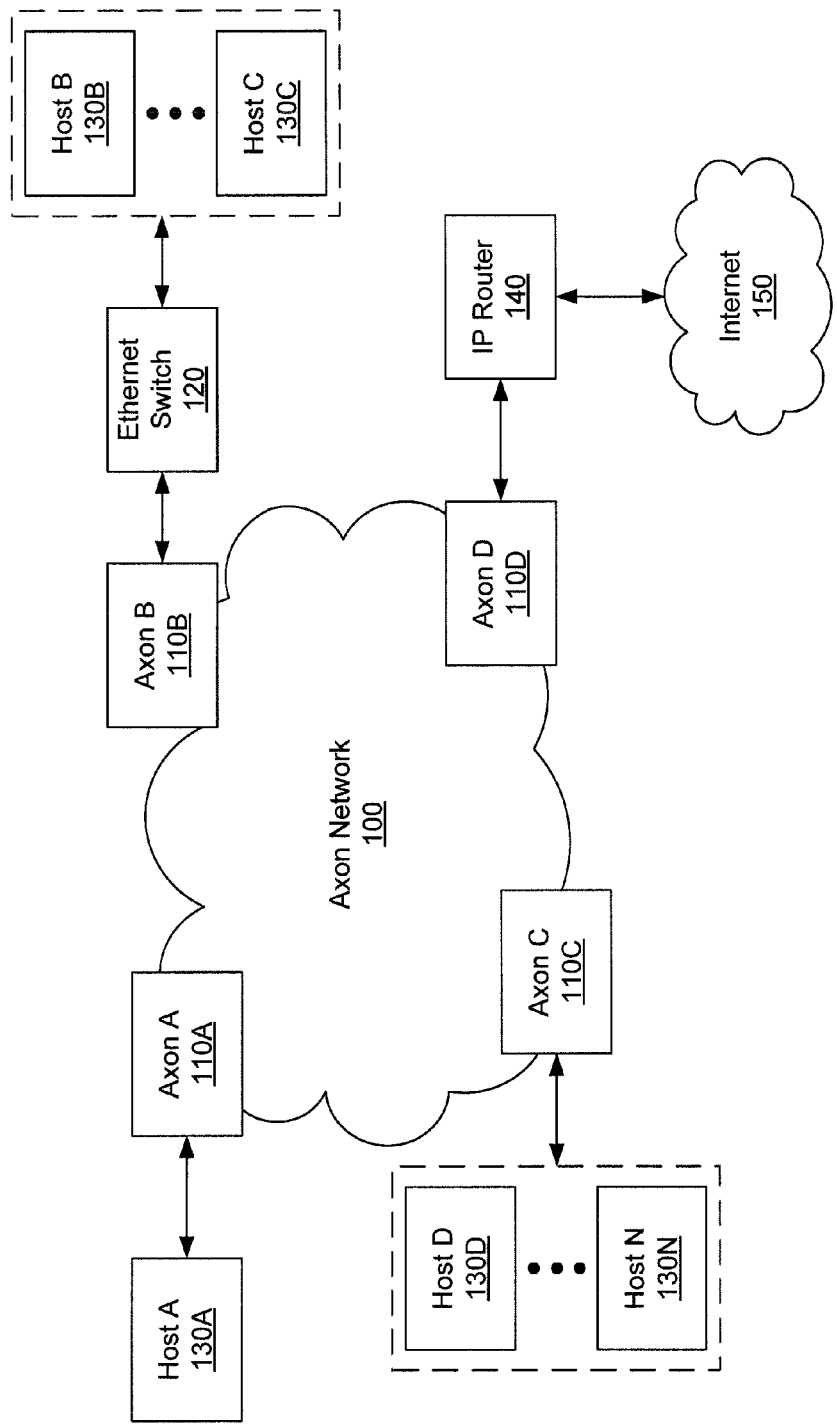
FIGS. 1A-1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scalable Ethernet. Specifically, embodiments of the invention provide a method and system for data packet transfer across a network using Axon devices and Axon packets.

According to one or more embodiments of the invention, the invention provides a method for scalable Ethernet to allow for data transfer across a network while reducing packet flooding and packet broadcasting. According to one or more embodiments of the invention, this is achieved, in part, by using source routing to specify the route the packet uses to traverse a network. In order to achieve source-routed Ethernet, the invention implements a modified ARP mechanism (referred to as Axon ARP) to obtain the information necessary to perform source-routed Ethernet. Once the Axon ARP is performed, data may be communicated between hosts using source-routed Ethernet.

FIG. 1A shows an example of a system in accordance with one or more embodiments of the invention. In one embodiment of the invention, the Axon network (100) may include any number of Axons each connected, using Ethernet, to: (i) at least one host (e.g., 130A, 130D, 130N) and at least one other Axon or (ii) at least two other Axons. Further, any number of Axons may be connected to an Ethernet switch (120), which may be operatively connected to at least one host (e.g., 130B, 130C). Each Axon is configured to transfer data across the Axon network (100) using Axon packets. According to one or more embodiments of the invention, the Axon network is a Local Area Network (LAN). In one embodiment of the invention, each Axon in the Axon network may be connected to all other Axons in the Axon network or to a subset thereof. Those skilled in the art will appreciate that the Axon network may be implemented using any network topology. In one embodiment of the invention, a host corresponds to any device configured to send and/or receive Ethernet packets. Examples of hosts include, but are not limited to, IP routers (e.g., 140), servers, and end-user computer systems. Those skilled in the art will appreciate that while an IP router is shown in the example, routers that handle other types of network protocols may be substituted.

In order for hosts to transmit and receive data packets across an Axon Network (100), each such host must be operatively connected to an Axon. According to one or more embodiments of the invention, while each host must be connected to an Axon, multiple hosts may be connected to a single Axon.

As an example, FIG. 1 shows Host A (130A) connected to the Axon Network (100) via Axon A (110A). Alternatively, Host B (130B) and Host C (130C) are connected to the Axon network (100) through an Ethernet Switch (120). The Ethernet Switch (120) is connected to the Axon Network (100) via Axon B (110B). In contrast, two or more hosts, such as Host D through Host N (130D, 130N) may be operatively connected to one Axon, such as Axon C (110C).

In one embodiment of the invention, a given host may also transmit packets to a target destination, where the target destination is a host (or other system) not connected to the Axon Network. In such cases, the Axon Network may be used to transmit packets a portion of the way and another networking device and/or communication mechanism may be used to transmit the packets to the target destination. For example, Host A (130A) may send packets to a host connected to the Internet (140). In such cases, the packet is sent from Host A (130A) to Axon A (110A). The packet is then transmitted across the Axon Network (100) to Axon D (110D). Axon D (110D) subsequently transmits the packet to the IP Router (140), which in turn, transmits the packet over the Internet (150) to the target destination (not shown).

Figure 1B:
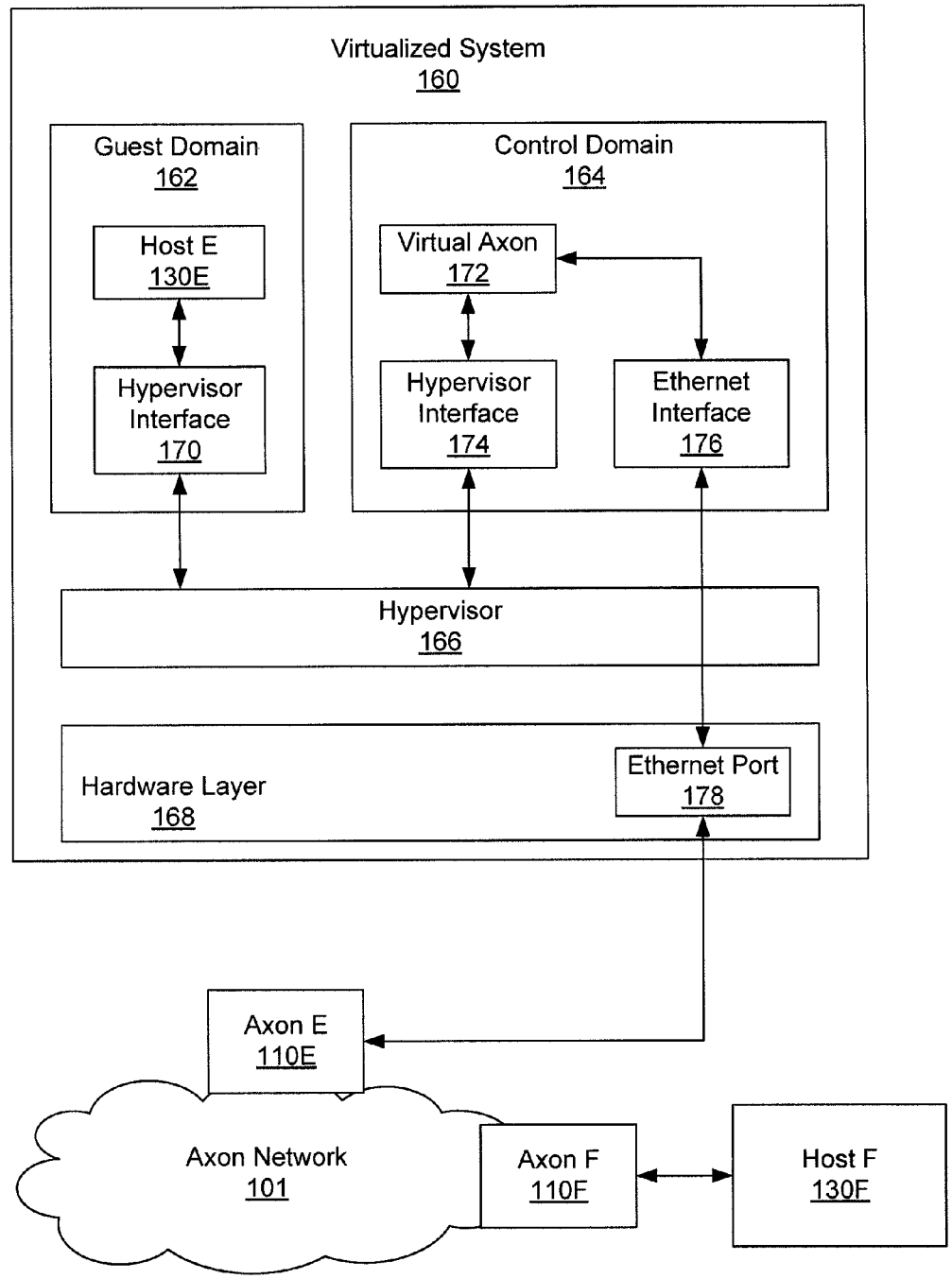

FIG. 1B shows an example of system in accordance to one or more embodiments of the invention. Specifically, the system includes a virtualized system (160) operatively connected to Axon E (110E). Further, Axon E (110E) is operatively connected to Axon F (110F) via the Axon Network (101). Finally, Axon F (110F) is operatively connected to Host F (130F).

In one embodiment of the invention, the virtualized system (i.e., a physical system which supports virtualization) (160) includes a guest domain (162) and a control domain (164). Each domain in the virtualized system includes an operating system instance configured to execute applications. For example, a host (e.g., Host E (130E)) may execute in the guest domain (162). Further, a virtual Axon (i.e., an Axon implemented entirely in software) may be executing in the control domain (164).

Continuing with the discussion of FIG. 1B, the domains may communicate with each other using a hypervisor (166). In one embodiment of the invention, the hypervisor (166) corresponds to any platform virtualization technology configured to virtualize a hardware layer (168) of the virtualized system (160). Example of virtualization technology include, but are not limited to, Xen and VMware. Xen® is a trademark overseen by the Xen Project Advisory Board and VMware® is a registered trademark of VMware, Inc.

Continuing with the discussion of FIG. 1B, the guest domain (162) may communicate with hosts external to the virtualized system via the control domain (164). Further, the control domain (164) may communicate with hosts external to the virtualized system via the hypervisor (166) and the hardware layer (168). For example, Host E (130E) may communicate with Host F (130F) as follows.

Initially, Host E (130E) transmits an Ethernet packet destined for Host F (130F). The Ethernet packet is transmitted via the hypervisor interface (170), the hypervisor (166), and the hypervisor interface (174) to the virtual Axon (172). The virtual Axon (172), upon receipt of the Ethernet packet, performs the necessary steps to generate an Axon packet (described below). The resulting Axon packet is then sent to Axon E (110E) via Ethernet interface (176), hypervisor (166), and Ethernet port (178). Axon E (110E) upon receipt of the Axon packet, transmits the packet across the Axon network (101) to Axon F (110F). Axon F (110F) upon receipt of the Axon packet, performs the necessary steps (described below) to generate an Ethernet packet. The resulting Ethernet packet is subsequently transmitted to Host F (130F).

In another embodiment of the invention, the Axon may be implemented in the hardware layer (168) (for example, in a network interface card (not shown)). In such instances, the control domain (164) may include an Axon Manager (not shown), which includes functionality to (i) configure the Axon in the hardware layer (168), (ii) enable users within the control domain to configure all or a portion of the Axon in the hardware layer (168). Those skilled in the art will appreciate that implementing the Axon in the hardware layer (168) may include (i) implementing the Axon in firmware (or other persistent storage) within the hardware layer and/or (ii) implementing the Axon as a circuit (or series of circuits).

Those skilled in the art will appreciate that Axon E interacts with the virtual Axon as if the virtual Axon is a physical Axon. Further, Host E interacts with the virtual Axon (i) as if the virtual Axon is a physical Axon and (ii) as if the Host E and the virtual Axon are located on physically separate devices. Further, those skilled in the art will appreciate that one or more Axons in the Axon network may be virtual Axons.

Those skilled in the art will appreciate that the Axon network (100) shown in FIGS. 1A and 1B are just two examples of an Axon network configuration and the examples are not intended to limit the scope of the invention.

Figure 2:
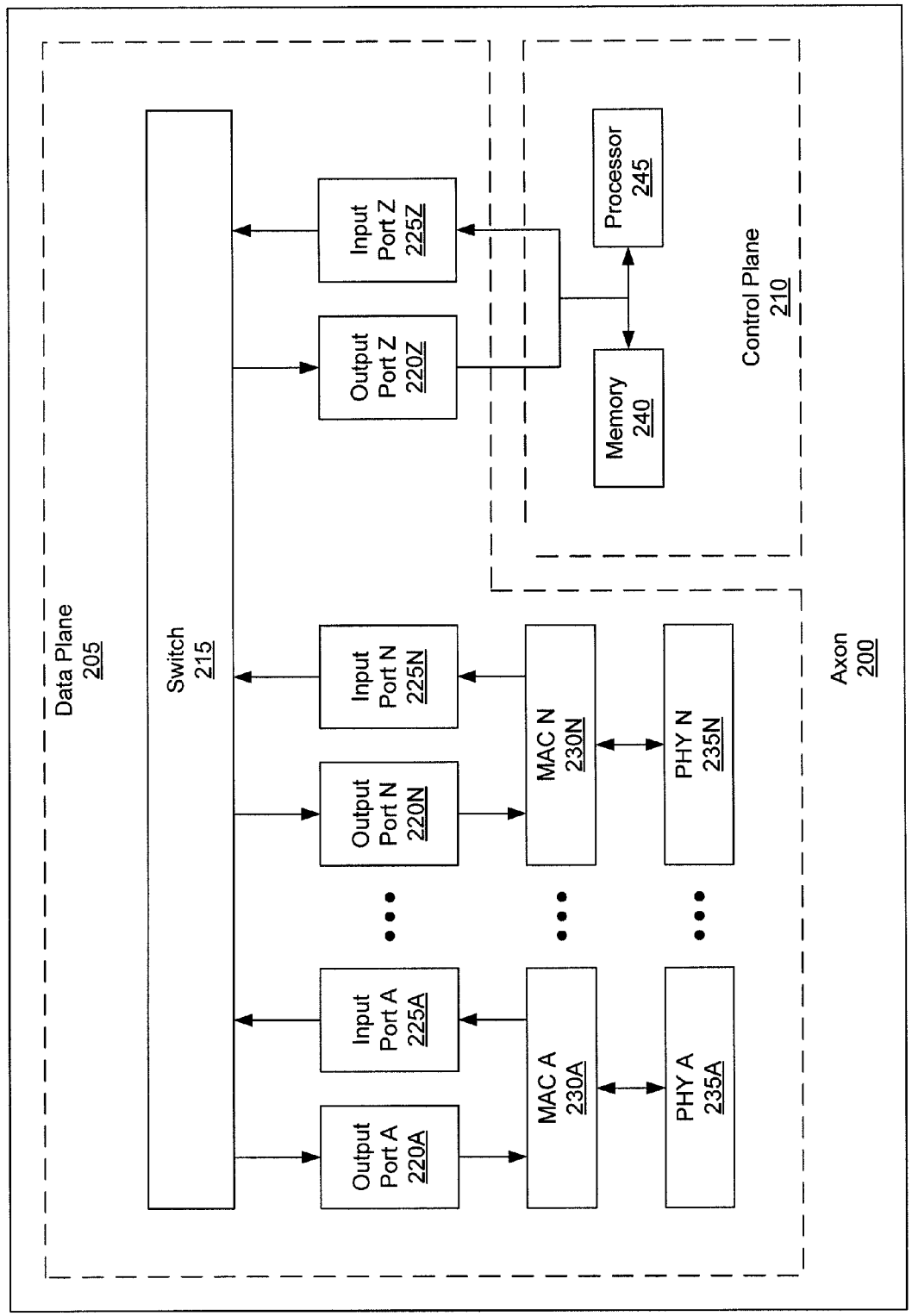
FIG. 2 shows an Axon in accordance with one or more embodiments of the invention.

FIG. 2 shows the architecture of an Axon (200) in accordance with one or more embodiments of the invention. As shown in FIG. 2, the Axon (200) includes a data plane (205) and a control plane (210). The data plane (205) allows the Axon (200) to connect to one or more physical Ethernet ports (not shown). In one embodiment of the invention, the control plane (210) configures each Ethernet port to handle either Ethernet packets or Axon packets, depending on the type of device to which the port is attached. For example, if an Ethernet port is connected to a host, then the control plane configures the Ethernet port to handle Ethernet packets. If an Ethernet port is connected to another Axon, then the control plane (210) configures the Ethernet port to handle Axon packets. It is important to note that when a packet is sent from one Axon to be received by a second Axon, the packet is only required to traverse the data plane (205) of the Axon (200).

In one embodiment of the invention, the data plane (205) includes a switch (215), one or more output ports (220A, 220N, 220Z), one or more input ports (225A, 225N, 225Z), a media access control (MAC) layer (230A, 230N), and a physical (PHY) layer (235A, 235N). In one embodiment of the invention, the physical layer (235A, 235N) provides an interface between the physical Ethernet ports (not shown) and the Axon (200). In one embodiment of the invention, the MAC layer (230A, 230N) provides an interface between the physical layer (235A, 235N) and the input ports (225A, 225N, 225Z) and output ports (220A, 220N, 220Z). Further, the MAC layer (230A, 230N) provides channel access control mechanisms to enable Axons to communicate with each other in the Axon network.

In one embodiment of the invention, each input port and output port corresponds to a buffer configured to store a pre-defined number of packets. The size of the buffer may vary between input and output ports. In one embodiment of the invention, the switch (215) is configured to receive packets from an input port and provide the packet to the appropriate output port (described below).

In one embodiment of the invention, the control plane (210) includes a memory (240) and a processor (245). The memory corresponds to any medium capable of storing data. Examples of memory include, but are not limited to, random access memory (RAM), flash-type storage devices (e.g., NAND-Flash memory, NOR-Flash memory, etc.), hard disks (i.e., non-volatile storage devices which store digitally encoded data on rotating platters with magnetic surfaces), hybrid storage devices (i.e., storage devices that include two or more types of storage media, for example, flash-type medium and magnetic media), or a combination thereof. According to one or more embodiments of the invention, memory is allocated to each host operatively connected to the Axon (200) such that for each input port there exists allocated memory and the allocated memory is inaccessible to other hosts connected to the Axon.

In one embodiment of the invention, the Axon (200) may include additional memory (not shown), where the additional memory is associated with the input and output ports. In one embodiment of the invention, the additional memory is configured to store route entries (described below) for hosts operatively connected to the input ports. Further, the memory is configured to temporarily store packets while they are being processed by the Axon. In one embodiment of the invention, there may be a single additional memory for all input and output ports. Alternatively, there may be multiple additional memories, such that there is one additional memory for each port (input or output) or for a subset of ports (input or output).

Figure 3:
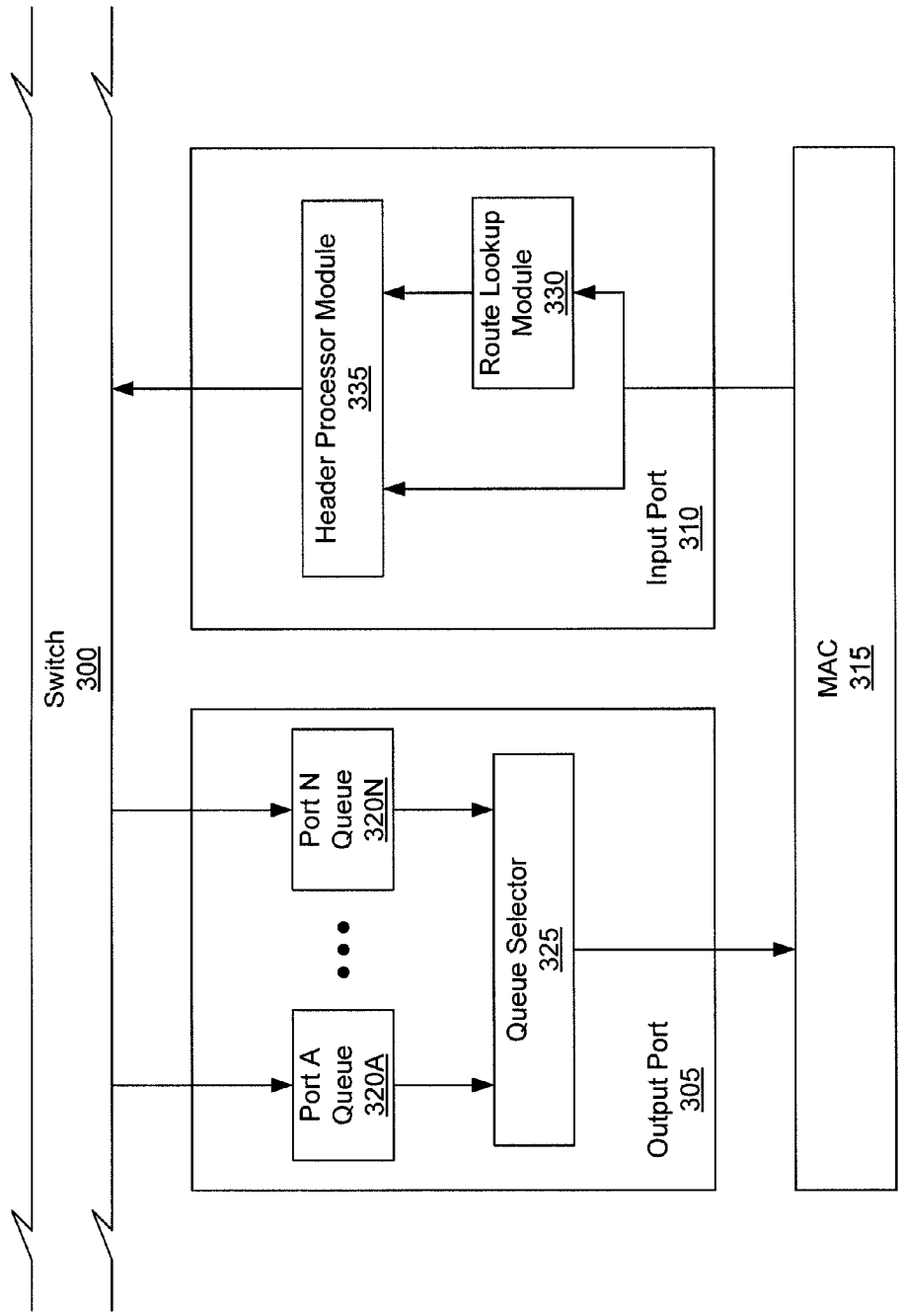
FIG. 3 shows a detailed view of a portion of an Axon in accordance with one or more embodiments of the invention.

FIG. 3 shows a detailed view of a portion of an Axon in accordance with one or more embodiments of the invention. The detailed view includes a switch (300), an output port (305), an input port (310), and a MAC (315). In one embodiment of the invention, packets are received at the input port (310) via the MAC (315). Upon processing of the packets by the input port (310), the packet is sent to an output port (305) via the switch (300). Finally, the packet leaves the Axon via the output port (305).

In one embodiment of the invention, the input port (310) includes a route lookup module (330) and a header processor module (335). In one embodiment of the invention, the route lookup module (330) is configured to receive an Ethernet packet, generate an Axon packet, and send the Axon packet to the header processor module (335). In one embodiment of the invention, the header processor module (335) is configured to receive an Axon packet, determine whether the Axon packet should be sent to an Axon or a host, and process the packet accordingly.

In one or more embodiments of the invention, packets are only processed by the route lookup module (330) when the input port (310) is receiving packets from a host. In one embodiment of the invention, Axons that are not directly connected to a host (also referred to as "intermediate Axons") may only include the header processor module (335) and not include the route lookup module (330). In other embodiments, all input ports for all Axons (regardless of what they are connected to) include both the route lookup module (330) and the header processor module (335). Those skilled in the art will appreciate that while the header processor module (335) and the route lookup module (330) perform different tasks, the two modules may be replaced with one module that incorporates the functionality of the header processor module (335) and the route lookup module (330). The functionality of the route lookup module (330) and the header process module (335) are described in detail below.

Continuing with the discussion of FIG. 3, the output port (305) is configured to receive packets that have been processed by the header processor module (335) and are ready to be sent over an Ethernet link. In one or more embodiments of the invention, the output port (305) includes one or more Port Queues (320A, 320N) and a queue selector (325). In one or more embodiments of the invention, there is one port queue (320A, 320N) in each output port (305) for each input port (310) in the Axon. According to one or more embodiments of the invention, the Port Queues (320A, 320N) are cut-through queues that allow for cut-through routing in an Axon. According to one or more embodiments of the invention, the queue selector (325) includes functionality to determine from which port queue to select a packet to send. In one embodiment of the invention, the queue selector uses a round-robin algorithm such that the number of packets processed from each port queue is equal (or substantially equal). In another embodiment of the invention, the queue selector uses an algorithm that ensures the amount of packets (measured, for example, in bytes) processed from each port queue is equal (or substantially equal). Those skilled in the art will appreciate that other selection algorithms may be used.

Figure 4:
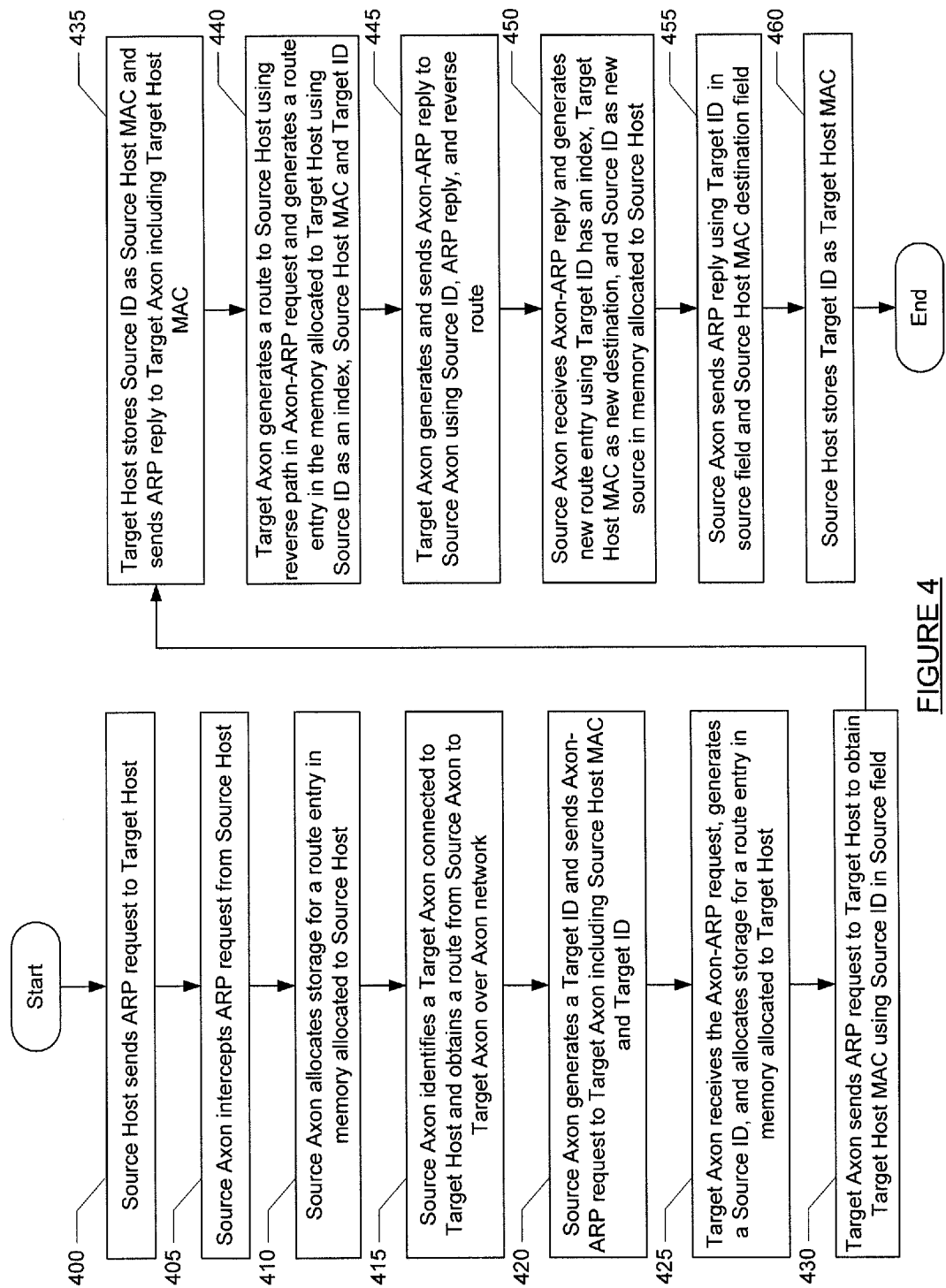
FIG. 4 shows a flow chart in accordance with one or more embodiments of the invention.

FIG. 4 shows a flowchart in accordance with one or more embodiments of the invention. More specifically, FIG. 4 shows a method for sending an Address Resolution Protocol (ARP) request from a source host to a target host across an Axon network. Those skilled in the art will appreciate that in order for two hosts to interact with each other across an Ethernet network, one host must send an ARP request to a second host to identify the MAC address of the second host. Further, those skilled in the art will appreciate that in order to utilize source routing between two hosts, one host must send an ARP request to the second host to obtain routes between the two hosts.

While the various steps in this flowchart are presented and described sequentially, one of ordinary skill will appreciate that some or all of the steps may be executed in different orders, may be combined or omitted, and some or all of the steps may be executed in parallel.

Turning to FIG. 4, at 400, the source host sends an ARP request to the target host. Those skilled in the art will appreciate that the source host knows the source host MAC address and the source host internet protocol (IP) address, as well as the target host IP address. For the purpose of this example, the ARP request is used to find a MAC address corresponding to an IP address; however, those skilled in the art will appreciate that the ARP request may be used to determine the MAC address corresponding to the network layer address of any protocol.

At 405, a source Axon intercepts the ARP request from the source host. According to one or more embodiments of the invention, the source Axon is operatively connected to the source host, such that the source host uses the source Axon to communicate across an Axon network.

At 410, the source Axon allocates storage for a route entry in memory allocated to the source host. As described above, multiple hosts may be connected to one Axon. Accordingly, each host operatively connected to an Axon has memory allocated for that host. This memory is used to store route information for the source host to communicate with the target host in the future without requiring a second ARP request.

At 415, the source Axon identifies a target Axon operatively connected to the target host. The source Axon obtains a route from the source Axon to the target Axon. Those skilled in the art will appreciate that the source Axon may obtain the route in various ways, including but not limited to a distributed hash table or a central controller.

Figure 8:
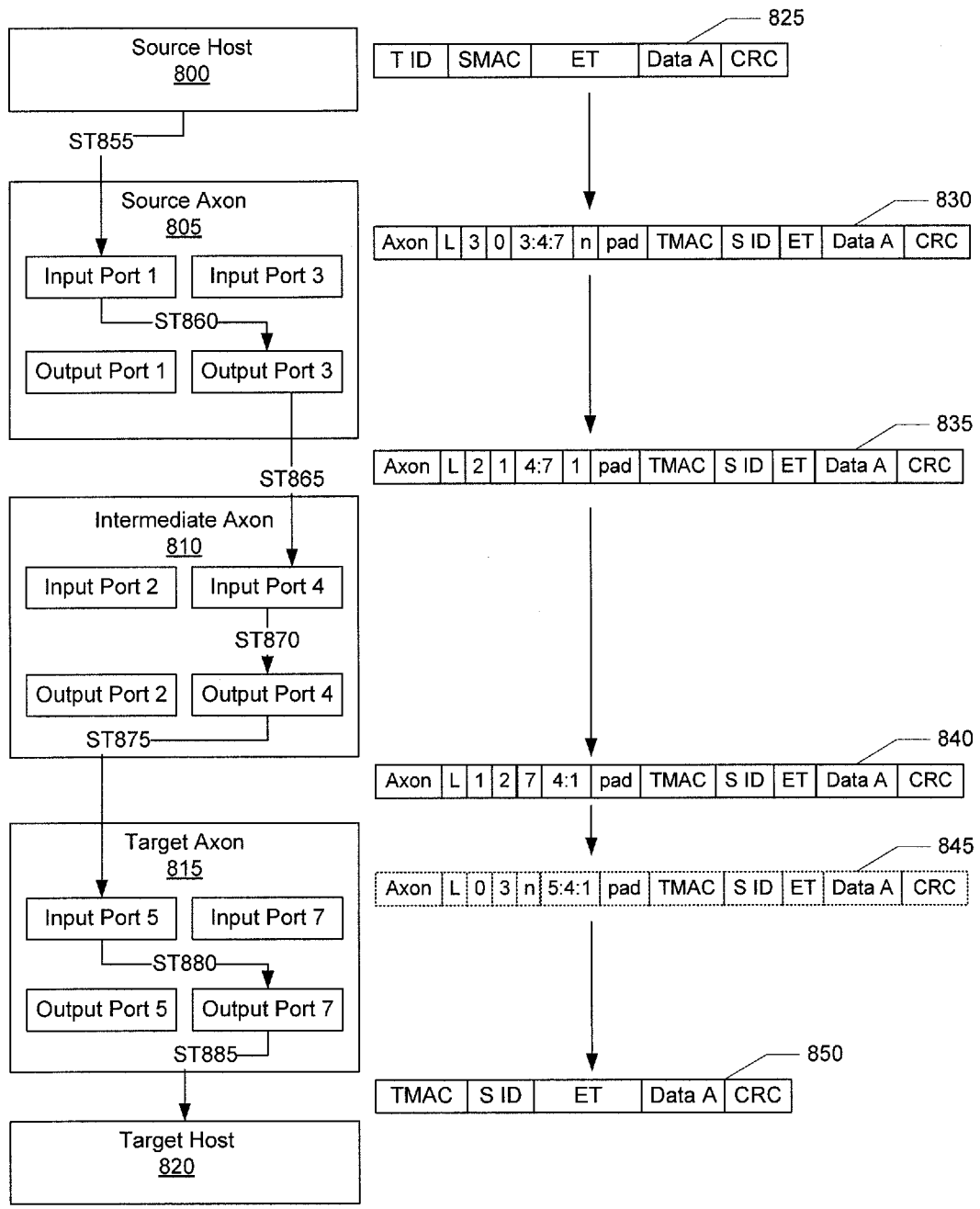
FIG. 8 shows an example of packet flow in accordance with one or more embodiments of the invention.

At 420, the source Axon generates a target identification. According to one or more embodiments of the invention, the target identification is a locally administered MAC address. Those skilled in the art will appreciate that using a locally administered MAC address eliminates the possibility of conflicting with any actual MAC address on the network. According to one or more embodiments of the invention, the target identification is used as an index to identify data needed to route a packet to the target Axon (described below). The target identification is also used as the perceived target MAC address of the target host. The source Axon uses the target identification to generate an Axon-ARP request and sends the Axon-ARP request across an Axon network to the target Axon. The Axon-ARP request is generated using the MAC address associated with the source host and the target identification. Those skilled in the art will appreciate that the Axon-ARP request is transmitted across the Axon network using the route obtained in 415. FIG. 8 describes an example of a packet traversing the Axon Network.

At 425, the target Axon receives the Axon-ARP request and allocates storage for a route entry in memory allocated to the target host. Similarly to the allocated memory described at 410, this memory is used to store the index and route information necessary to transmit packets from the target Axon to the source Axon. As described above, the target Axon may be operatively connected to a number of hosts. Each of these hosts has allocated memory in the target Axon. Further, the target Axon generates a source identification is used as an index to identify data needed to route a packet to the source Axon from the target Axon. The source identification is also used as the perceived source MAC address to the target host. According to one or more embodiments of the invention, the target Axon temporarily stores the Axon-ARP request so that it may be accessed later.

At 430, the target Axon sends an ARP request to the target host. According to one or more embodiments of the invention, the ARP request includes the source identification in the source MAC field. At 435, the target host stores the source identification as a new source MAC address in the allocated memory. Further, the target host generates and sends an ARP reply that includes the actual target host MAC address (i.e., the TMAC) to the target Axon.

At 440, the target Axon generates a route from the target Axon to the source host using the reverse route in the Axon-ARP request and generates a route entry in the memory allocated to the target host. Alternatively, the target Axon may obtain the route from another source. The route entry includes the MAC address associated with the source host and the target identification. According to one or more embodiments of the invention, the route entry also includes the route from the target Axon to the source Axon. In one embodiment of the invention, the aforementioned route entry is indexed using a source identification (discussed above).

At 445, the target Axon generates and sends an Axon-ARP reply to the source Axon. According to one or more embodiments of the invention, the Axon-ARP reply includes the source identification, the ARP reply, and the reverse route. In one embodiment of the invention, the source identification is a locally administered MAC address.

At 450, the source Axon receives the Axon-ARP reply and generates a new header. The MAC address associated with the target host is stored as a new destination and the source identification is stored as a new source in the memory allocated to the source host. In addition, the route from the source Axon to the target Axon may be stored. According to one or more embodiments of the invention, the target identification is used to index the routing information.

At 455, the source Axon sends an ARP reply to the source host. In the ARP reply, the target identification is used in the source field and the MAC address associated with the source host is used in the destination field. At 460, the source host stores the target identification as the MAC address for the target host.

In one embodiment of the invention, an Axon connected to a host appears to the host as an Ethernet switch (or equivalent device). Accordingly, pursuant to the Ethernet protocol, the source host sends an ARP request to the Axon and expects an ARP reply with the MAC address of the target host. The target host operates in a similar manner to the source host. Accordingly, the method shown in FIG. 4 allows the source host and target host to remain unchanged while enabling the source host and target host to perform the ARP request/ARP reply defined by the Ethernet protocol.

Figure 5:
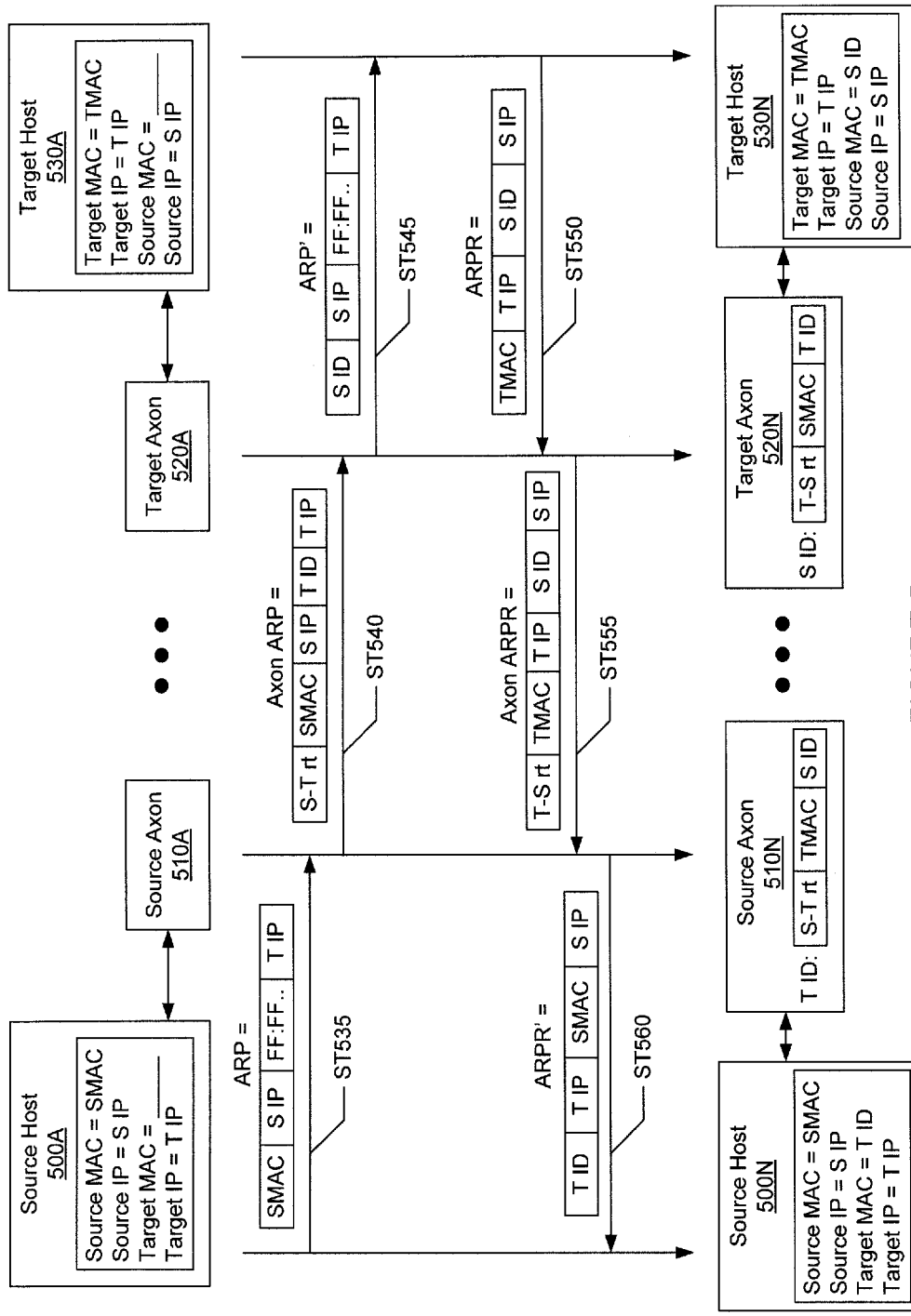
FIG. 5 shows an example in accordance with one or more embodiments of the invention.

FIG. 5 shows an example of the method shown in FIG. 4. The example is not intended to limit the scope of the invention. Turning to FIG. 5, FIG. 5 shows an example of an ARP request and an ARP reply sent from a source host (500A, 500N) to a target host (530A, 530N) using a source Axon (510A, 510N) and a target Axon (520A, 520N). Further, FIG. 5 shows the state of the components before the ARP request at the source host (500A), the source Axon (510A), the target Axon (520A), and the target host (530A). The diagram also shows the state of the components after the ARP reply at the source host (500N), the source Axon (510N), the target Axon (520N), and the target host (530N).

Turning to the example, the source host (500A, 500N) and the source Axon (510A, 510N) are operatively connected. Similarly, the target Axon (520A, 520N) and the target host (530A, 530N) are also operatively connected. According to one or more embodiments of the invention, the source Axon (510A, 510N) and the target Axon (520A, 520N) are directly connected to each other or are connected over an Axon network that includes one or more intermediate Axons.

Before the process begins, the source host (500A) includes the source host MAC address ("SMAC"), the source host IP address ("S IP"), and the target host IP address ("T IP"). Similarly, the target host (530A) includes data identifying the target host MAC address ("TMAC"), the target host IP address ("T IP"), and the source host IP address ("S IP"). Those skilled in the art will appreciate that while this example shows that the target host includes data identifying the source host IP address, it is not necessary for purposes of this invention.

At ST535, the source host (500A) sends an ARP request to locate the target host (530A). Those skilled in the art will appreciate that an ARP request includes at least a sender's MAC address, a sender's IP address, a target IP address, and a broadcast MAC address (i.e., "FF:FF:FF:FF:FF:FF"). In this example, the ARP includes "SMAC," "S IP," and "T IP".

Upon receiving the ARP request from the source host (500A), the source Axon (510A) converts the ARP request to an Axon-ARP request. According to one or more embodiments of the invention, the ARP request is converted to an Axon-ARP request in the control plane of the source Axon (510). According to one or more embodiments of the invention, the source Axon (510A) obtains a route from the source Axon (510A) to the target Axon (520A), generates a target identification ("T ID"), replaces the broadcast MAC address with the target identification, and prepends the route to the ARP request. According to one or more embodiments of the invention, the Axon-ARP request may also include a reverse route field (not shown), which is populated while the Axon-ARP request traverses the Axon network. At ST540, the source Axon (510A) sends the Axon-ARP request to the target Axon (520A). According to one or more embodiments of the invention, the source Axon (510A) sends the Axon-ARP request to the target Axon (520A) using the route in the Axon-ARP request.

When the target Axon (520A) receives the Axon-ARP request, the target Axon (520) stores the Axon-ARP request in local memory allocated to the target host (530A). The target Axon (520A) generates a source identification (i.e., "S ID") to be used as a perceived source MAC address to the target host. The source identification is also be used as an index to identify information needed to route packets from the target Axon (520A) to the source Axon (510A).

The target Axon (520A) subsequently generates an ARP request (denoted ARP') from received Axon-ARP request by removing the route from the Axon-ARP request, replacing SMAC with S ID, and replacing T ID with the broadcast MAC address (i.e., "FF:FF:FF:FF:FF:FF"). At 545, the target Axon (520A) sends the ARP request (i.e., "ARP'") to the target host (530A).

Upon receiving the ARP request, the target host (530A) identifies S ID as the source host MAC address. The target host (530A) stores S ID as the perceived source host MAC address. The target host (530N) subsequently generates an ARP reply to send back to the source host (500A). Those skilled in the art will appreciate that, similar to an ARP request, an ARP reply includes at least a sender hardware address (now the target host's MAC address), a sender protocol address (target host's IP address), a target protocol address (source host IP address), and a target hardware address (source host's MAC address). In the example given, the ARP reply includes the sender hardware address ("TMAC"), the sender protocol address ("T IP"), the target hardware address ("S ID"), and the target protocol address ("S IP"). At ST550, the target host (530N) sends the ARP reply to the target Axon (520N).

Upon receiving the ARP reply, the target Axon (520N) stores a route entry in memory allocated to the target host allowing packets to flow from the target Axon (520A) to the source Axon (510A). According to one or more embodiments of the invention, the route entry includes the sender hardware address (i.e., "SMAC"), the target identification (i.e., "T ID"), and a route (i.e., "T-S rt") from the target Axon (520A) to the source Axon (510A). The route from the target Axon (520A) to the source Axon (510A) may be obtained using such methods as a hash table or central controller, or may be obtained from a reverse route in the Axon-ARP request as described above. According to one or more embodiments of the invention, the source identification ("S ID") is used to index the aforementioned route entry. According to one or more embodiments of the invention, storing the Axon header in memory facilitates bidirectional communication.

The target Axon (520N) generates the appropriate Axon-ARP reply using the ARP reply. According to one or more embodiments of the invention, the target Axon (520N) obtains a route (i.e., "T-S rt") from the target Axon (520N) to the source Axon (510A), and prepends the route to the ARP request. According to one or more embodiments of the invention, if the target Axon (520N) previously stored a route from the target Axon (520N) to the source Axon (510A) that this route may be obtained directly from the target Axon as opposed to requesting the route from another entity.

At ST555, the target Axon (520N) sends the Axon-ARP reply to the source Axon (510A). According to one or more embodiments of the invention, the target Axon (520N) sends the Axon-ARP reply to the source Axon (510A) using the obtained route.

When the source Axon (510A) receives the Axon-ARP reply, the source Axon (510A) stores a route entry in memory allocated to the source host (500A) at an address based on the target identification. According to one or more embodiments of the invention, the route entry includes the sender hardware address (i.e., "TMAC"), the source identification (i.e., "S ID"), and a route from the source Axon (i.e., Source Axon (510A)) to the target Axon (i.e., Target Axon (520A)) (i.e., "S-T rt"). The route ("S-T rt") may be obtained using such methods as a hash table or central controller, or may be generated using a reverse route in the Axon-ARP reply (not shown) that is generated by storing the input ports the reply passes through in each Axon along the route. According to one or more embodiments of the invention, the target identification ("T ID") is used to index the aforementioned route entry.

The source Axon subsequently generates an ARP reply using the Axon-ARP reply by removing the route from the Axon-ARP reply, replacing the sender hardware address with T ID and the destination hardware address with SMAC (previously obtained from ARP request in ST535). Accordingly, the resulting ARP reply, sent from the source Axon (510N) to the source host (500A) at ST560, includes the perceived sender hardware address (i.e., "T ID"), a sender protocol address (i.e., "T IP"), a target protocol address (i.e., "S IP"), and a target hardware address (i.e., "SMAC"). Upon receiving the ARP reply, the source host (500A) identifies the T ID as the target host MAC. The source host (500A) stores the target identification T ID as the perceived target host MAC address.

Those skilled in the art will appreciate that the source host (500N) stores a T ID in place of a MAC address associated with the target host, and the target host (530N) stores a S ID in place of a MAC address associated with the source host.

Figure 6:
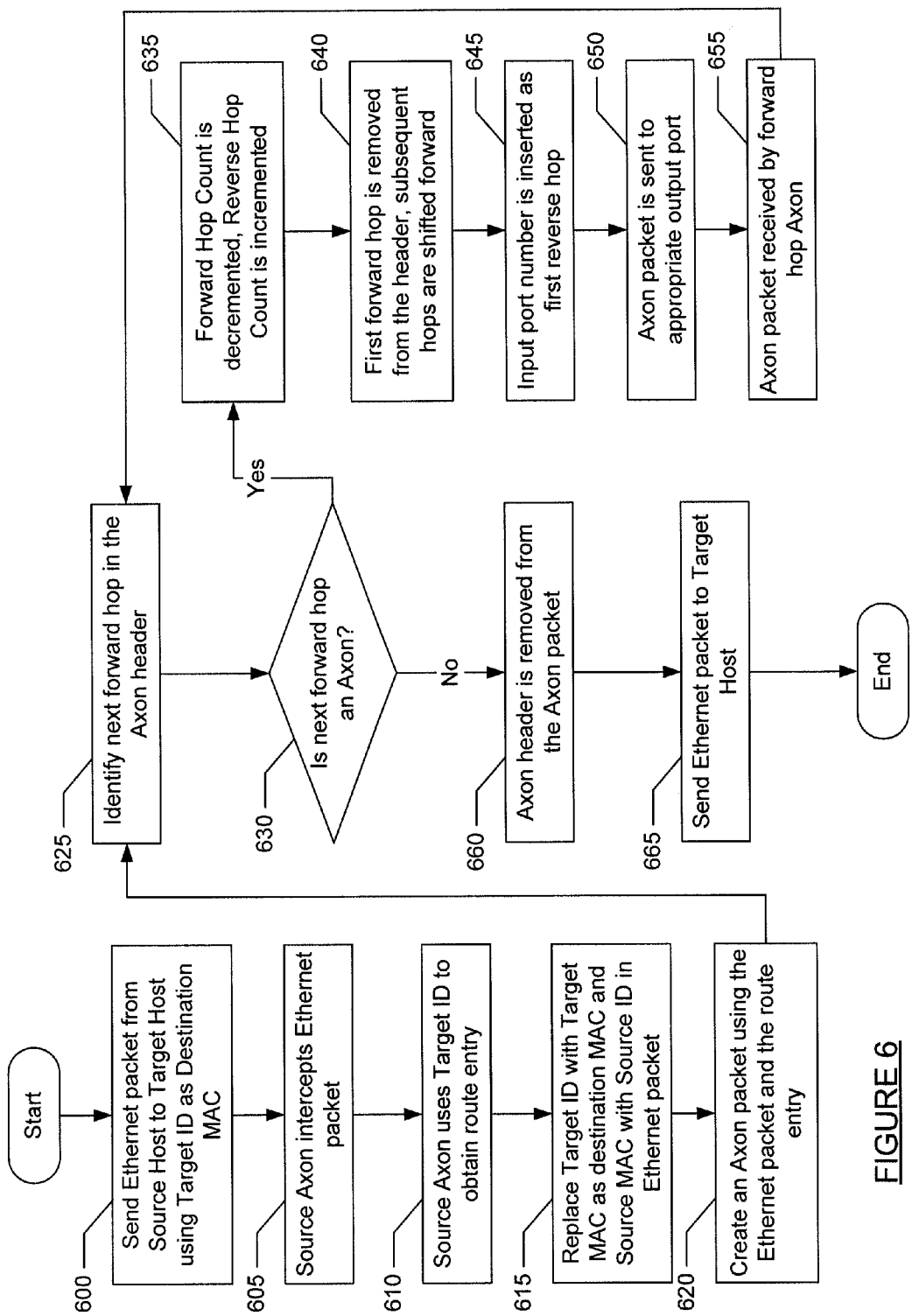
FIG. 6 shows a flow chart in accordance with one or more embodiments of the invention.

FIG. 6 shows a flowchart in accordance with one or more embodiments of the invention. Specifically, FIG. 6 details a method for sending Ethernet packets from a source host to a target host across an Axon network after the routes have been set up, as shown in FIG. 4. Because an Axon network allows hosts across an Axon network to interact with each other as if they were located on the Ethernet network, the Ethernet packets are encapsulated into an Axon packet prior to traversing an Axon network. Similarly, the Ethernet packets are extracted from the Axon packet prior to being transmitted to the target host.

While the various steps in this flowchart are presented and described sequentially, one of ordinary skill will appreciate that some or all of the steps may be executed in different orders, may be combined or omitted, and some or all of the steps may be executed in parallel.

At 600, a source host sends an Ethernet packet to a target host. Those skilled in the art will appreciate that an Ethernet packet includes a destination MAC address, a source MAC address, and data. This Ethernet packet includes the T ID (in the source MAC address field) as the destination MAC address and the MAC address of the source host. At 605, the Ethernet packet is intercepted by a source Axon. As described above, the source Axon is operatively connected to the source host.

At 610, the source Axon obtains a route entry in order to generate an Axon packet and send the Axon packet from the source Axon to a target Axon. According to one or more embodiments of the invention, the source Axon obtains the route entry stored in the Axon memory allocated to the source host using the T ID. The route entry includes the route from the source Axon to the target Axon, as well as the target host MAC address and the perceived sender MAC address, S ID. The route may include one or more hops, wherein each hop is identified in the route by an output port. According to one or more embodiments of the invention, the source Axon uses the route lookup module in the input port on which the Ethernet packet was received to obtain the route entry and generate the Axon packet.

At 615, the source Axon replaces the T ID in the Ethernet packet received from the source host with the target host MAC address. The source MAC address of the source host is replaced with the S ID. According to one or more embodiments of the invention, the target host MAC address is included in the Ethernet packet because this is the destination MAC address that the target host expects to be presented in the received Ethernet packet. Accordingly, the source Axon generates an Ethernet packet that is expected by the target host.

At 620, the source Axon creates an Axon packet using the Ethernet packet (modified in 615) and the route entry. According to one or more embodiments of the invention, the Axon packet is created by prepending the Axon header (generated using data from the route entry) to the Ethernet packet, such that the Ethernet packet is intact while the Axon packet traverses the Axon network. According to one or more embodiments of the invention, the Axon header may include other fields, such as a forward hop count, a reverse hop count, a reverse route, a packet type, an Axon packet length, etc.

At 625, the source Axon identifies the next forward hop in the Axon header. In one embodiment of the invention, the next forward hop identifies an output port on the Axon. The next forward hop may be found at the front of the route from the source Axon to the target Axon. According to one or more embodiments of the invention, the header processor module identifies the next forward hop in the Axon header.

At 630, a determination is made about whether the output port identified by the next forward hop is connected to another Axon or to a host. As described above, each hop in the route identifies an output port along the route. Accordingly, the source Axon may determine whether this output port is connected to another Axon or to a host.

When the output port identified by the next forward hop is connected to an Axon, then at 635, the forward hop count is decremented and the reverse hop count is incremented. Those skilled in the art will appreciate that while managing hop counts in the Axon header may be beneficial, it may not be necessary to implement the invention. According to one or more embodiments of the invention, the header processor module in the Axon manages the hop counts.

At 640, the next forward hop (i.e., the output port at the front of the route) is removed from the route and subsequent hops are shifted forward within the route. At 645, the identification for the input port of the Axon currently handling the Axon packet is entered as a hop in the reverse path. Those skilled in the art will appreciate that while generating a reverse path may be useful for implementation, it may not be necessary to implement the invention.

At 650, the Axon packet is sent to the appropriate output port as determined by the next forward hop in the route. According to one or more embodiments of the invention, the Axon packet is sent through a switch in the Axon before arriving at the output port. At 655, the output port sends the Axon packet to the next Axon via the appropriate layers in the Axon. According to one or more embodiments of the invention, the Axon packet is sent using point-to-point Ethernet. The process then proceeds to 625.

When the output port identified in next forward hop is not connected to an Axon, the process proceeds to 660. At 660, the Axon header is removed from the Axon packet. According to one or more embodiments of the invention, when the next forward hop is a port connected to a host, then the Axon currently handling the Axon packet is connected to the target host. According to one or more embodiments of the invention, removing the Axon header from the Axon packet results in an Ethernet packet. At 665, the Ethernet packet is sent to the target host via the output port specified in the route of the Axon packet received by the Axon in 625.

Figure 7:
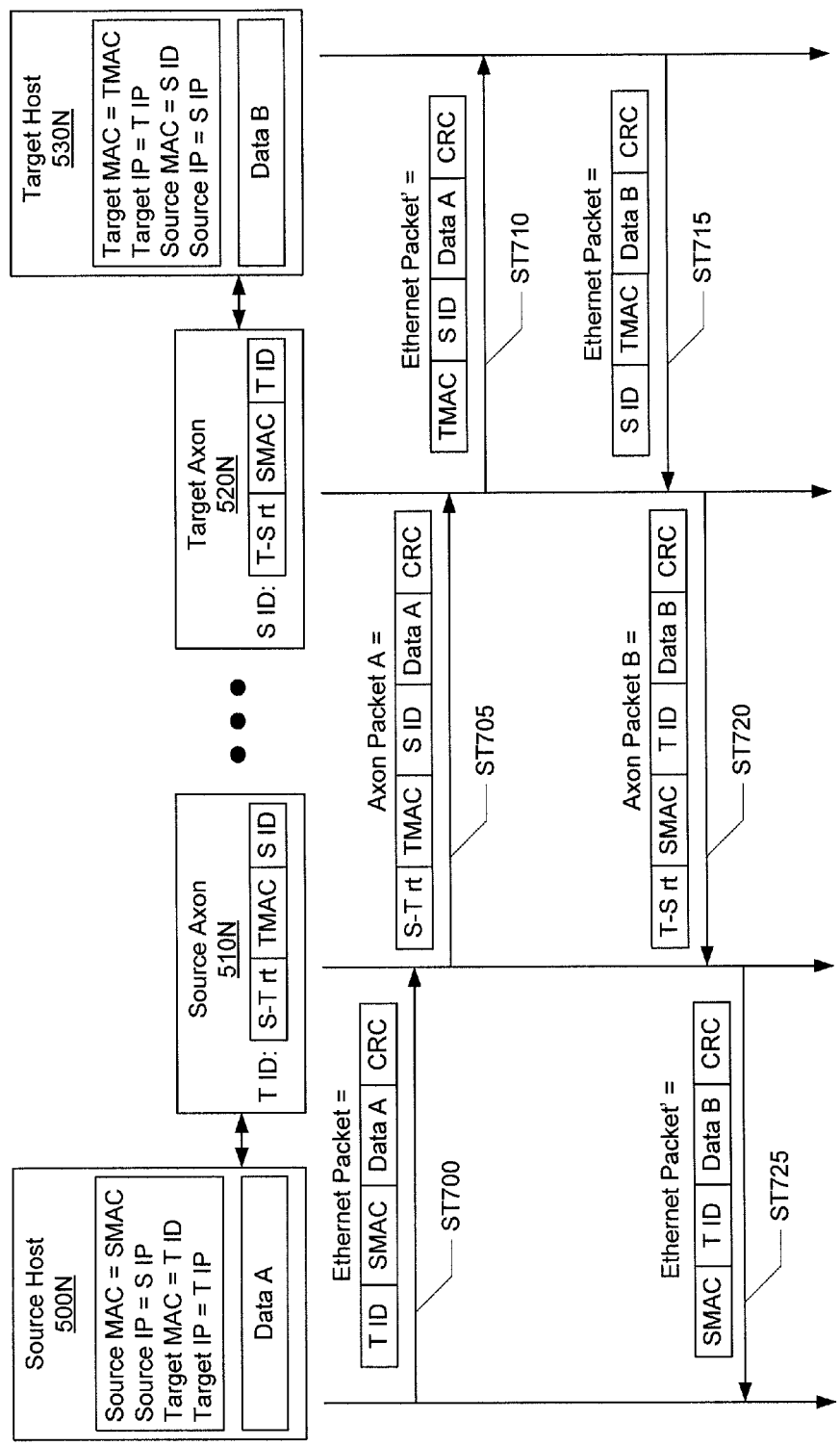
FIG. 7 shows an example in accordance with one or more embodiments of the invention.

FIG. 7 shows an example according to one or more embodiments of the invention. The example is not intended to limit the scope of the invention. Specifically, FIG. 7 shows an example of data traversing an Axon network from a source host to a target host. Specifically, FIG. 7 shows a source host (500N) sending data, Data A, to a target host (530N). FIG. 7 also shows the target host (530N) sending data, Data B, to the source host (500N). The states of the components (500N, 510N, 520N, and 530N) correspond to the states of the components after the ARP request and ARP reply have been completed pursuant to the example in FIG. 5.

Referring to FIG. 7, at ST700, the source host (500N) sends an Ethernet packet to the target host (530N) that includes Data A. Those skilled in the art will appreciate that the Ethernet packet shown is simplified for purposes of this example and may not include all components of an actual Ethernet packet. The Ethernet packet shown includes a destination address ("T ID"), a source address ("SMAC"), the data being transported ("Data A"), and a cyclic redundancy check entry ("CRC"). Those skilled in the art will appreciate that while the cyclic redundancy check entry is designated as "CRC" throughout the example, the value of the CRC will be modified after each hop along the route.

Upon receiving the Ethernet packet, the source Axon (510N) generates an Axon packet that encapsulates the Ethernet packet. According to one or more embodiments of the invention, the route lookup module in the input port of the source Axon generates the Axon packet. In this example, the T ID is used to obtain the route entry, which includes the route from the source Axon to the target Axon. Using the route ("S-T rt") and other data from the route entry, the Axon packet is generated, where the Axon header includes route and other fields (not shown) such as a forward hop count, reverse hop count, packet type, packet length, reverse route, etc. Further, the Ethernet packet is modified such that the destination address (i.e., "T ID") is replaced with the target host MAC address (i.e., "TMAC"). The Ethernet packet is further modified such that the source address (i.e., "SMAC") is replaced with the perceived source address (i.e., "S ID"). The Axon header is then prepended to the front of the modified Ethernet packet to generate Axon packet A.

Once the Axon packet A has been generated, the source Axon processes the Axon header. According to one or more embodiments of the invention, the Axon header is processed by the header processor module in the input port of the source Axon. The source Axon identifies the next forward hop in the Axon header. The next forward hop is located at the front of the route. A determination is then made about whether the identified next forward hop is another Axon or to a host. As described above, each hop in the route identifies an output port along the route. Accordingly, the source Axon may determine whether this output port is connected to another Axon or to a host. In the example shown, the next forward hop is the target Axon (520N), although in other implementations the Axon packet may traverse any number of intermediate Axons prior to reaching the target Axon (520N). At ST705, the source Axon (510N) sends the Axon packet to the target Axon (520N).

Upon receiving Axon packet A, the target Axon (520N) processes the Axon header. According to one or more embodiments of the invention, the Axon header is processed by the header processor module in the input port which received Axon packet A in the target Axon (520N). According to one or more embodiments of the invention, the header processor in the Axon identifies the next forward hop. In this case, the next hop would be an output port associated with the target host (530N). Because the next forward hop is a host, the Ethernet packet is extracted from Axon packet A. More specifically, the Axon header is removed from Axon packet A to obtain an Ethernet packet. After the Ethernet packet has been modified, at ST710, the Ethernet packet is sent to the target host (530N).

As shown in FIG. 7, the Ethernet packet sent from the source host (500N) at ST700, and the Ethernet packet received at the target host (530N) at ST710 are not the same. For example, the source host perceives the destination address for the target host (530N) to be "T ID" when in reality the destination address for the target host (530N) is "TMAC." Further, the source address given to the target host (530N) is replaced with the S ID, because this is the perceived source of the Ethernet packet. Making this switch allows for data to be seamlessly communicated across the Axon network without requiring the hosts or the Ethernet protocol to be modified.

Returning to the example, at a later point in time, the target host (530N) sends data ("Data B") to the source host (500N). It is important to note that although the target host (530N) is acting as a source in this portion of the example, the original descriptions are kept for purposes of this example.

At ST710, the target host (530N) sends an Ethernet packet toward the source host (500N) including Data B. Those skilled in the art will appreciate that the Ethernet packet shown is simplified for purposes of this example and may not include all components of an actual Ethernet packet. The Ethernet packet shown includes a destination address ("S ID"), a source address ("TMAC"), the data being transported ("Data B"), and a cyclic redundancy check entry (CRC) for the packet.

Upon receiving the Ethernet packet, the target Axon (520N) generates an Axon packet that encapsulates the Ethernet packet in the same manner as described above with respect to source Axon (510N). Specifically, in this example, the S ID is used to obtain the route entry, which includes the route ("T-S rt") from the target Axon (520N) to the source Axon (510A). Using the route entry, the Axon packet is generated, where the Axon header includes route and other fields (not shown) such as a forward hop count, reverse hop count, packet type, packet length, reverse route, etc. Further, the Ethernet packet is modified such that the destination address (i.e., "S ID") is replaced with the target host MAC address (i.e., "SMAC") and the source address (i.e., "TMAC") is replaced with the perceived source address (i.e., "T ID"). The Axon header is then prepended to the front of the modified Ethernet packet to generate Axon packet B.

Once the Axon packet B has been generated, the target Axon (i.e., 520N) processes the Axon header. According to one or more embodiments of the invention, the Axon header is processed by the header processor module in the input port of the target Axon (520N). Specifically, the next forward hop in the Axon header is identified. A determination is then made about whether the identified next forward hop is another Axon. In the example shown, the next forward hop is the source Axon (510N), although in other implementations the Axon packet may traverse any number of intermediate Axons prior to reaching the source Axon (510N). At ST720, the target Axon (520N) sends the Axon packet to the source Axon (510N) via the output port identified in the route.

Upon receiving Axon packet B, the source Axon (510N) processes the Axon header. According to one or more embodiments of the invention, the Axon header is processed by the header processor module in the input port which received Axon packet B in the source Axon (500N). According to one or more embodiments of the invention, the header processor in the Axon identifies the next forward hop. In this case, the next hop is an output port associated with the source host (500N). Because the next forward hop is a host, the Ethernet packet is extracted from Axon packet B. More specifically, the Axon header is removed from Axon packet B to obtain an Ethernet packet. After the Ethernet packet has been modified, at ST725, the Ethernet packet is sent to the source host (500N).

While the above examples have described packet flow throughout an Axon network in general terms, FIG. 8 provides a more specific example. Specifically, FIG. 8 is a flow diagram showing a packet traversing an Axon network, detailing the state of the packet as it is transmitted through the Axon network. Those skilled in the art will appreciate that the following example is merely one implementation of the invention and is not intended to limit the scope of the claimed invention.

Referring to FIG. 8, the components of the Axon network in this example include a source host (800), a source Axon (805), an intermediate Axon (810), a target Axon (815), and a target host (820). The example describes a data packet sent from the source host (800) to the target host (820) across the series of Axons.

As discussed above, packets are transported across an Axon network using input ports and output ports located in each Axon. According to one or more embodiments of the invention, each Axon may include the components described in FIG. 2 and FIG. 3. However, for purposes of this example, only the ports used in the example are shown.

Turning to the example, consider a scenario in which the source host (800) and the target host (820) have performed the ARP-request/ARP-reply described in FIG. 5. After the ARP-request/ARP-reply is completed, the source host (800) proceeds to send a packet to the target host (820). Initially, the source host (800) generates an Ethernet packet (825) to send to the target host (820). The Ethernet packet (825) in this example includes a destination address ("T ID", the target identification), a source address ("SMAC", the source host MAC address), a packet type ("ET", representing the Ethernet Type, which identifies the type and protocol of the payload of the Ethernet packet, e.g., IP), a collection of data ("Data A"), and a CRC for the packet. At ST855, Ethernet packet (825) is transmitted to the source Axon (805).

Upon receiving the Ethernet packet (825) at Input Port 1, the source Axon proceeds to encapsulate the Ethernet packet (825) in an Axon packet (830). As described above, the source Axon obtains the route entry stored in the source Axon (805) using the T ID as an index. The route entry is subsequently used to generate the Axon header. In addition, the source Axon (805) replaces the destination address in the Ethernet packet (825) with the actual destination address ("TMAC") and the source address is replaced with the perceived source address ("S ID").

In this example, the Axon packet (830) includes the following fields in the header: (i) packet type—Axon, (ii) packet length—L, (iii) forward hop count—3, reverse hop count—0, (iv) the route—3:4:7, the reverse route—n (which signifies null for purposes of this example), and padding for implementation purposes. The second part of the Axon packet is an Ethernet packet, which includes the destination address ("TMAC"), source address ("S ID"), the data packet ("Data A"), and a CRC for the packet. Those skilled in the art will appreciate that presence of a given field, the order to the fields, and the values listed in the fields are for exemplary purposes only and are not intended to limit the scope of the invention.

In this example, the forward hop count denotes the number of hops remaining for the packet to reach the destination. The reverse hop count in the Axon packet (830) denotes the number of hops that have been traversed in the route. Further, the route includes a list of output ports the Axon packet (830) must traverse to reach its destination and the reverse route in the Axon packet (830) includes a list of the input ports the Axon packet (830) has traversed thus far, allowing the Axon packet to reverse its path, if necessary.

Returning to the example, after the Axon packet is generated by the route lookup module located in Input Port 1, the Axon packet is processed by the header processor module in Input Port 1. Specifically, the header processing module determines the next forward hop from the route (i.e., 3) and, using the next forward hop, determines whether the output port identified by the next forward hop is connected to an Axon or a host. In the example, Output Port 3 is connected to another Axon (i.e., intermediate Axon (810)). The forward hop count is subsequently decremented, the reverse hop count is incremented, the route is updated to remove "3", and the reverse route is updated to include Input Port 1 (i.e., the port on which Ethernet packet (825) was received). The result of processing the Axon header is the Axon packet (835). At ST860, the Axon packet (835) is sent to Output Port 3 via a switch in the Source Axon (not shown). At ST865, the Axon packet (835) is sent, via Output Port 3, to the intermediate Axon (810).

The Axon packet (835) arrives at the intermediate Axon (810) at Input Port 4. Upon arrival, Input Port 4 processes the Axon header. As discussed above, the Axon header (835) is only processed by the header processor module. The Axon packet (835) does not need to be processed by the route lookup module as the route was previously determined. The header processor module in Input Port determines that the next forward hop is Output Port 4. Based on this, the intermediate Axon (810) determines that Output Port 4 is connected to another Axon. The header processor module further processes the Axon header as follows: (i) the forward hop count is decremented, (ii) the reverse hop count is incremented, (iii) the first forward hop is removed from the route and subsequent hops are shifted forward within the route, and (iv) Input Port 4 is entered as a hop in the reverse route. The result of processing the Axon header is the Axon packet (840). At ST870, the Axon packet (840) is sent to Output Port 4 via a switch in the intermediate Axon (not shown). At ST875, the Axon packet (845) is sent to the target Axon (815).

The Axon packet (840) arrives at the target Axon (815) at Input Port 5. Upon arrival, Input Port 5 processes the Axon header. Specifically, the header processor module in the target Axon (815) identifies the next forward hop in the Axon header as Output Port 7 and, based on this, determines that Output Port 7 is connected to a host. According to one or more embodiments of the invention, the target Axon (815) may proceed to extract Ethernet Packet (850) from the Axon packet (840). Alternatively, in one or more embodiments of the invention, the header processor module processes the Axon header a final time to generate a final Axon packet (845) before generating the Ethernet packet (850). For purposes of this example, both scenarios are described.

When the target Axon (815) processes the Axon header a final time to generate a final Axon packet (845), the forward hop count is decremented and the reverse hop count is incremented, the next forward hop is removed from the route resulting in an empty route field, and Input Port 5 is entered as a hop in the reverse route. The result of processing the Axon header is the Axon packet (845). The reverse route may then be used to communicate packets across the Axon Network from the target host to the source host.

With respect to extracting the Ethernet packet (850) from Axon packet (840), the header processor module removes the Axon header from the Axon packet, leaving an Ethernet packet. The resulting Ethernet packet is Ethernet packet (850). At ST885, the Ethernet packet (850) is sent from the target Axon (815) to the target host (820).

FIGS. 4-8 illustrate one or more embodiments of the invention that employ source and target IDs to rewrite Ethernet headers when the packets are transferred across the network. According to one or more embodiments of the invention, the system may employ a content-addressable memory ("CAM") on each Axon that may simplify the setup to transfer data packets across the network because the Ethernet header no longer has to be modified. In one embodiment of the invention, CAMs maps a MAC address (source or target) to an identification (source or target). FIGS. 9-13 illustrate how the CAM technique may be employed in the system.

Figure 9:
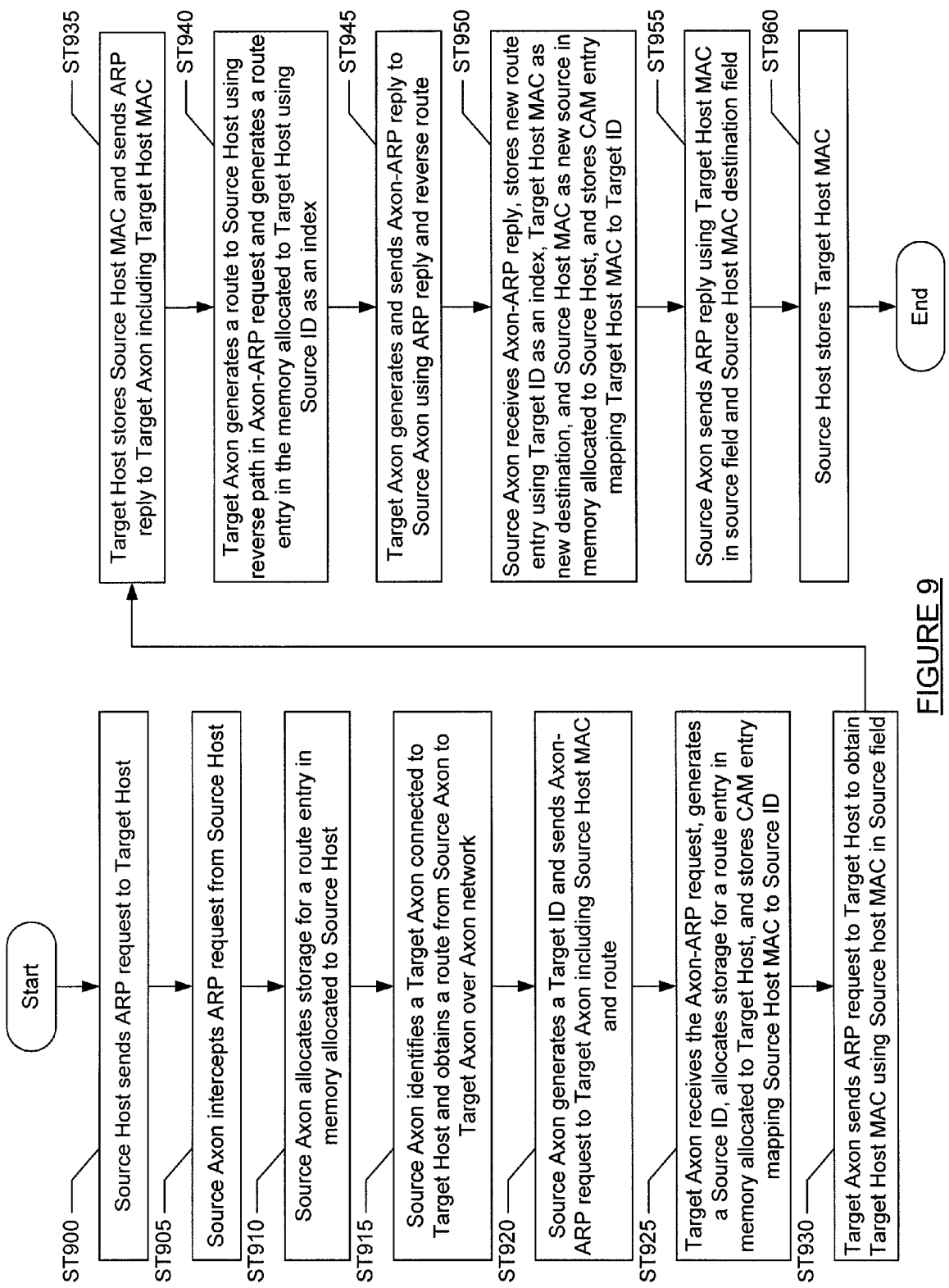
FIG. 9 shows a flow chart in accordance with one or more embodiments of the invention.

FIG. 9 shows a flowchart in accordance with one or more embodiments of the invention. More specifically, FIG. 9 shows a method for sending an Address Resolution Protocol (ARP) request from a source host to a target host across an Axon network using CAMs. Those skilled in the art will appreciate that in order for two hosts to interact with each other across an Ethernet network, one host must send an ARP request to a second host to identify the MAC address of the second host. Further, those skilled in the art will appreciate that in order to utilize source routing between two hosts, one host must send an ARP request to the second host to obtain routes between the two hosts.

While the various steps in this flowchart are presented and described sequentially, one of ordinary skill will appreciate that some or all of the steps may be executed in different orders, may be combined or omitted, and some or all of the steps may be executed in parallel.

Turning to FIG. 9, at ST900, the source host sends an ARP request to the target host. Those skilled in the art will appreciate that the source host knows the source host MAC address and the source host internet protocol (IP) address, as well as the target host IP address. For the purpose of this example, the ARP request is used to find a MAC address corresponding to an IP address; however, those skilled in the art will appreciate that the ARP request may be used to determine the MAC address corresponding to the network layer address of any protocol.

At ST905, a source Axon intercepts the ARP request from the source host. According to one or more embodiments of the invention, the source Axon is operatively connected to the source host, such that the source host uses the source Axon to communicate across an Axon network.

At ST910, the source Axon allocates storage for a route entry in memory allocated to the source host. As described above, multiple hosts may be connected to one Axon. Accordingly, each host operatively connected to an Axon has memory allocated for that host. This memory is used to store route information for the source host to communicate with the target host in the future without requiring a second ARP request.

At ST915, the source Axon identifies a target Axon operatively connected to the target host. The source Axon obtains a route from the source Axon to the target Axon. Those skilled in the art will appreciate that the source Axon may obtain the route in various ways, including but not limited to a distributed hash table or a central controller.

Figure 13:
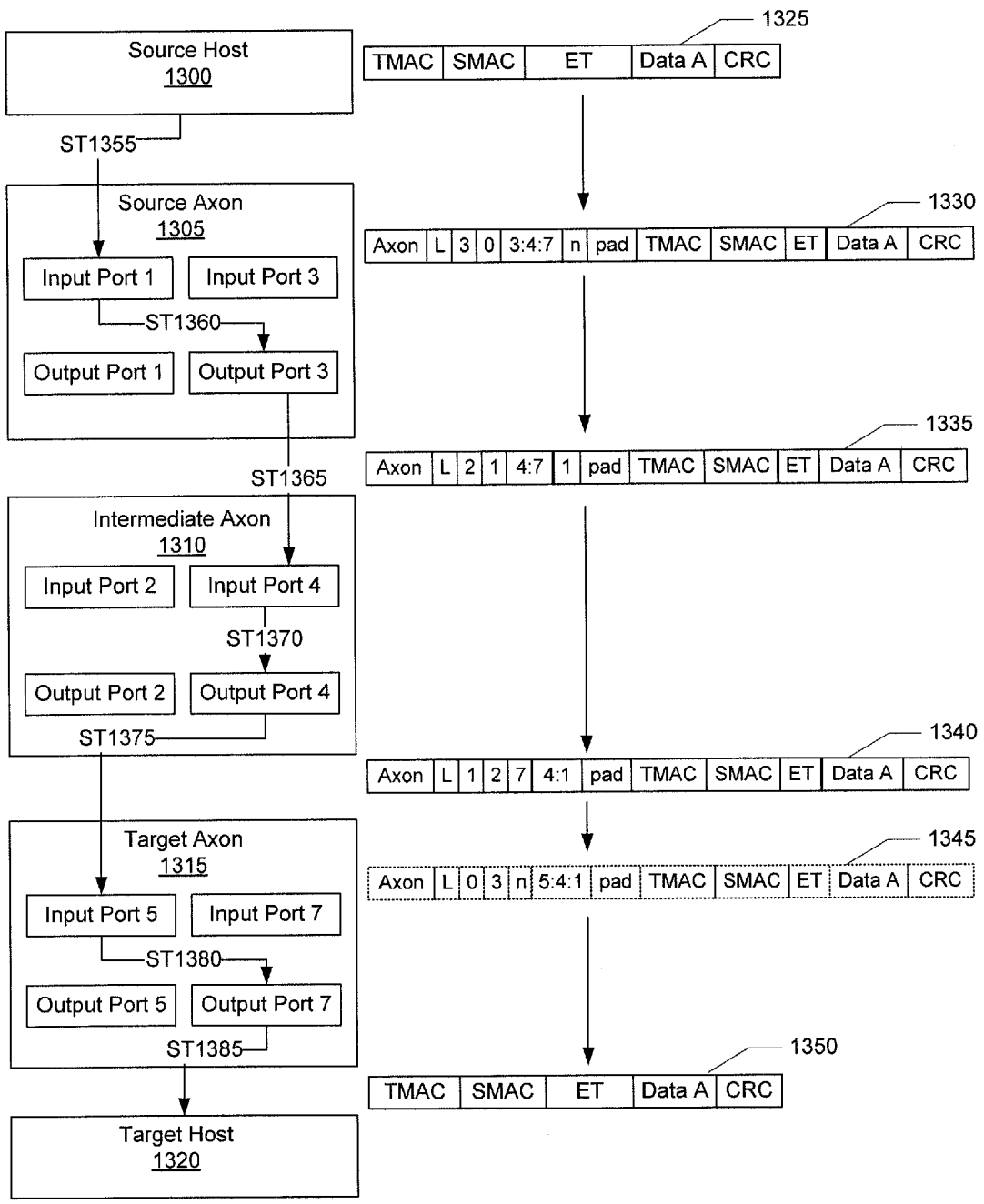
FIG. 13 shows an example of packet flow in accordance with one or more embodiments of the invention.

At ST920, the source Axon generates a target identification. According to one or more embodiments of the invention, the target identification is a locally administered MAC address. Those skilled in the art will appreciate that using a locally administered MAC address eliminates the possibility of conflicting with any actual MAC address on the network. According to one or more embodiments of the invention, the target identification is used as a locally stored index to identify data needed to route a packet to the target Axon (described below). Thus, the target identification is used to create an entry for a determined route between the source Axon and the target Axon. Those skilled in the art will appreciate that the Axon-ARP request is transmitted across the Axon network using the route obtained in ST915. FIG. 13 describes an example of a packet traversing the Axon Network. Unlike the packet sent in 420 in FIG. 4, the Axon-ARP request that is generated does not involve manipulating information already in the header (i.e., the target MAC entry is not replaced with the target identification). Rather, the original Ethernet header remains intact, and the route information is appended.

At ST925, the target Axon receives the Axon-ARP request and allocates storage for a route entry in memory allocated to the target host. Similarly to the allocated memory described at ST910, this memory is used to store the lookup and route information necessary to communicate from the target Axon to the source Axon. As described above, the target Axon may be operatively connected to a number of hosts. Each of these hosts has allocated memory in the target Axon. Further, the target Axon generates a source identification is used as an index to identify data needed to route a packet to the source Axon from the target Axon. According to one or more embodiments of the invention, the target Axon stores a CAM entry that maps the source MAC address to the generated source identification. Thus, the route from the target Axon to the source Axon may be identified using either the source identification, or the source MAC. According to one or more embodiments of the invention, the target Axon temporarily stores the Axon-ARP request so that it may be accessed later.

At ST930, the target Axon sends an ARP request to the target host. Because this situation uses CAMs, unlike in FIG. 4, the ARP request includes the source MAC. Thus, at ST935, the target host stores the actual source MAC as a new source MAC address in the allocated memory. Further, the target host generates and sends an ARP reply that includes the actual target host MAC address (i.e., the TMAC) to the target Axon.

At ST940, the target Axon generates a route from the target Axon to the source host using the reverse route in the Axon-ARP request and generates a route entry in the memory allocated to the target host. Alternatively, the target Axon may obtain the route from another source. The route entry includes the MAC address associated with the source host and the target identification. According to one or more embodiments of the invention, the route entry also includes the route from the target Axon to the source Axon. In one embodiment of the invention, the aforementioned route entry is indexed using a source identification (discussed above). Again, according to one or more embodiments of the invention, the target Axon stores a CAM entry that maps the source identification to the source MAC. Thus, the route may be retrieved using either the source identification or the source MAC.

At ST945, the target Axon generates and sends an Axon-ARP reply to the source Axon. According to one or more embodiments of the invention, the Axon-ARP reply includes the source MAC, the target MAC, the ARP reply, and the reverse route.

At ST950, the source Axon receives the Axon-ARP reply and strips the appended data from the header to reveal the true Ethernet header. The MAC address associated with the target host is stored as a new destination and the MAC address associated with the source host is stored as a new source in the memory allocated to the source host. In addition, the route from the source Axon to the target Axon may be stored, according to one or more embodiments of the invention. Further, a CAM entry is stored that includes a mapping between the target MAC and the target identification. Thus, the route entry may be retrieved using either the target identification, or the target MAC.

At ST955, the source Axon sends an ARP reply to the source host. In the ARP reply, the target MAC is used in the source field and the MAC address associated with the source host is used in the destination field. At ST960, the source host stores the true target MAC as the MAC address for the target host.

In one embodiment of the invention, an Axon connected to a host appears to the host as an Ethernet switch (or equivalent device). Accordingly, pursuant to the Ethernet protocol, the source host sends an ARP request to the Axon and expects an ARP reply with the MAC address of the target host. The target host operates in a similar manner to the source host. Accordingly, the method shown in FIG. 9 allows the source host and target host to receive and store the true MAC addresses in the system while enabling the source host and target host to perform the ARP request/ARP reply defined by the Ethernet protocol.

Figure 10:
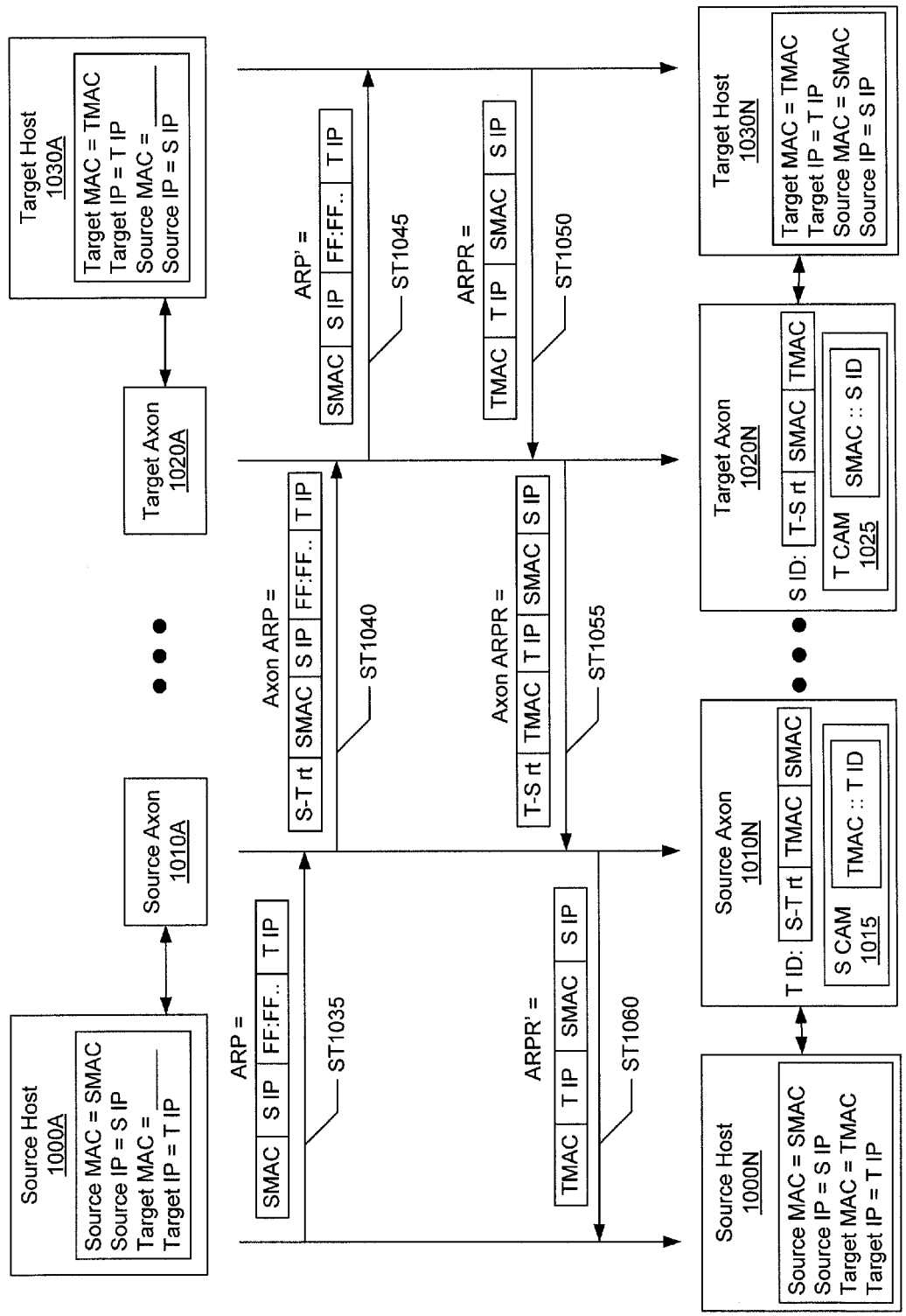
FIG. 10 shows an example in accordance with one or more embodiments of the invention.

FIG. 10 shows an example of the method shown in FIG. 9. The example is not intended to limit the scope of the invention. Turning to FIG. 10, FIG. 10 shows an example of an ARP request and an ARP reply sent from a source host (1000A, 1000N) to a target host (1030A, 1030N) using a source Axon (1010A, 1010N) and a target Axon (1020A, 1020N), implementing CAMs. Further, FIG. 10 shows the state of the components before the ARP request at the source host (1000A), the source Axon (1010A), the target Axon (1020A), and the target host (1030A). The diagram also shows the state of the components after the ARP reply at the source host (1000N), the source Axon (1010N), the target Axon (1020N), and the target host (1030N).

Turning to the example, the source host (1000A, 1000N) and the source Axon (1010A, 1010N) are operatively connected. Similarly, the target Axon (1020A, 1020N) and the target host (1030A, 1030N) are also operatively connected. According to one or more embodiments of the invention, the source Axon (1010A, 1010N) and the target Axon (1020A, 1020N) are directly connected to each other or are connected over an Axon network that includes one or more intermediate Axons.

Before the process begins, the source host (1000A) includes the source host MAC address ("SMAC"), the source host IP address ("S IP"), and the target host IP address ("T IP"). Similarly, the target host (530A) includes data identifying the target host MAC address ("TMAC"), the target host IP address ("T IP"), and the source host IP address ("S IP"). Those skilled in the art will appreciate that while this example shows that the target host includes data identifying the source host IP address, it is not necessary for purposes of this invention.

At ST1035, the source host (1000A) sends an ARP request to locate the target host (1030A). Those skilled in the art will appreciate that an ARP request includes at least a sender's MAC address, a sender's IP address, a target IP address, and a broadcast MAC address (i.e., "FF:FF:FF:FF:FF:FF"). In this example, the ARP includes "SMAC," "S IP," and "T IP".

Upon receiving the ARP request from the source host (1000A), the source Axon (1010A) converts the ARP request to an Axon-ARP request. According to one or more embodiments of the invention, the ARP request is converted to an Axon-ARP request in the control plane of the source Axon (1010). According to one or more embodiments of the invention, the source Axon (1010A) obtains a route from the source Axon (1010A) to the target Axon (1020A), generates a target identification ("T ID"), and prepends the route to the ARP request. Unlike the example shown in FIG. 5, this example illustrates that the Ethernet header need not be modified according to one or more embodiments of the invention. According to one or more embodiments of the invention, the Axon-ARP request may also include a reverse route field (not shown), which is populated while the Axon-ARP request traverses the Axon network. According to one or more embodiments of the invention, the target identification is stored in the source Axon to create an entry for the route from the source Axon to target Axon. At ST 1040, the source Axon (1010A) sends the Axon-ARP request to the target Axon (1020A). According to one or more embodiments of the invention, the source Axon (1010A) sends the Axon-ARP request to the target Axon (1020A) using the route in the Axon-ARP request.

When the target Axon (1020A) receives the Axon-ARP request, the target Axon (1020) stores the Axon-ARP request in local memory allocated to the target host (1030A). The target Axon (1020A) generates a source identification (i.e., "S ID"), which according to one or more embodiments of the invention, may be used as a perceived source MAC address to the target host. The source identification is also used as an index to identify information needed to route packets from the target Axon (1020A) to the source Axon (1010A). Additionally, the target Axon (1020A) stores a CAM entry (1015) that maps the SMAC to the S ID, according to one or more embodiments of the invention.

The target Axon (1020A) subsequently generates an ARP request (denoted ARP') from received Axon-ARP request by removing the route from the Axon-ARP request. Unlike ST545 in FIG. 5, in this example, it is not necessary to replace SMAC with S ID and replace T ID with the broadcast MAC address, because the original Ethernet header remained intact. At 1045, the target Axon (1020A) sends the ARP request (i.e., "ARP'") to the target host (1030A).

Upon receiving the ARP request, the target host (1030A) stores the actual source MAC address (i.e., SMAC) as the source host MAC address. The target host (530N) subsequently generates an ARP reply to send back to the source host (500A). Those skilled in the art will appreciate that, similar to an ARP request, an ARP reply includes at least a sender hardware address (now the target host's MAC address), a sender protocol address (target host's IP address), a target protocol address (source host IP address), and a target hardware address (source host's MAC address). In the example given, the ARP reply includes the sender hardware address ("TMAC"), the sender protocol address ("T IP"), the target hardware address ("SMAC"), and the target protocol address ("S IP"). At ST1050, the target host (1030N) sends the ARP reply to the target Axon (1020N).

Upon receiving the ARP reply, the target Axon (1020N) stores a route entry in memory allocated to the target host allowing packets to flow from the target Axon (1020A) to the source Axon (1010A). According to one or more embodiments of the invention, the route entry includes the sender hardware address (i.e., "SMAC"), the target identification (i.e., "TMAC"), and a route (i.e., "T-S rt") from the target Axon (1020A) to the source Axon (1010A). The route from the target Axon (1020A) to the source Axon (1010A) may be obtained using such methods as a hash table or central controller, or may be obtained from a reverse route in the Axon-ARP request as described above. According to one or more embodiments of the invention, the source identification ("S ID") is used to index the aforementioned route entry. According to one or more embodiments of the invention, storing the Axon header in memory facilitates bidirectional communication. In addition, the source Axon (1010N) stores a CAM entry (1015) that maps the source MAC address ("SMAC") to the source identification ("S ID"). Thus, the route entry may be identified either by the source identification, or the source MAC address, according to one or more embodiments of the invention.

The target Axon (1020N) generates the appropriate Axon-ARP reply using the ARP reply. According to one or more embodiments of the invention, the target Axon (1020N) obtains a route (i.e., "T-S rt") from the target Axon (1020N) to the source Axon (1010A), and prepends the route to the ARP request. According to one or more embodiments of the invention, if the target Axon (1020N) previously stored a route from the target Axon (1020N) to the source Axon (1010A) that this route may be obtained directly from the target Axon as opposed to requesting the route from another entity.

At ST1055, the target Axon (1020N) sends the Axon-ARP reply to the source Axon (1010A). According to one or more embodiments of the invention, the target Axon (1020N) sends the Axon-ARP reply to the source Axon (1010A) using the obtained route.

When the source Axon (1010A) receives the Axon-ARP reply, the source Axon (1010A) stores a route entry in memory allocated to the source host (1000A) at an address based on the target identification. According to one or more embodiments of the invention, the route entry includes the sender hardware address (i.e., "TMAC"), the source MAC address (i.e., "SMAC"), and a route from the source Axon (i.e., Source Axon (510A)) to the target Axon (i.e., Target Axon (520A)) (i.e., "S-T rt"). The route ("S-T rt") may be obtained using such methods as a hash table or central controller, or may be generated using a reverse route in the Axon-ARP reply (not shown) that is generated by storing the input ports the reply passes through in each Axon along the route. According to one or more embodiments of the invention, the target identification ("T ID") is used to index the aforementioned route entry. In addition, the source Axon (1010N) stores a CAM entry (1015) that maps the target MAC address ("TMAC") to the target identification ("T ID"). Thus, the route entry may be identified either by the source identification, or the source MAC address, according to one or more embodiments of the invention.

The source Axon subsequently generates an ARP reply using the Axon-ARP reply by removing the route from the Axon-ARP reply. Accordingly, the resulting ARP reply, sent from the source Axon (1010N) to the source host (1000A) at ST1060, includes the perceived sender hardware address (i.e., "TMAC"), a sender protocol address (i.e., "T IP"), a target protocol address (i.e., "S IP"), and a target hardware address (i.e., "SMAC"). The source host (1000A) stores the target MAC (i.e., "TMAC") as the perceived target host MAC address.

Those skilled in the art will appreciate that because the source host (1000N) and target host (1030N) will each know the true MAC address of the other, it is unnecessary to store SMAC and TMAC appended to the route entries in the source Axon (1010N) and target Axon (1020) according to one or more embodiments of the invention. However, according to one or more embodiments of the invention, the methods described in FIGS. 4 and 9 may be used interchangeably. Accordingly, in one or more embodiments of the invention, storing the true MAC addresses with the route entry facilitates in transmission of data packets.

Figure 11:
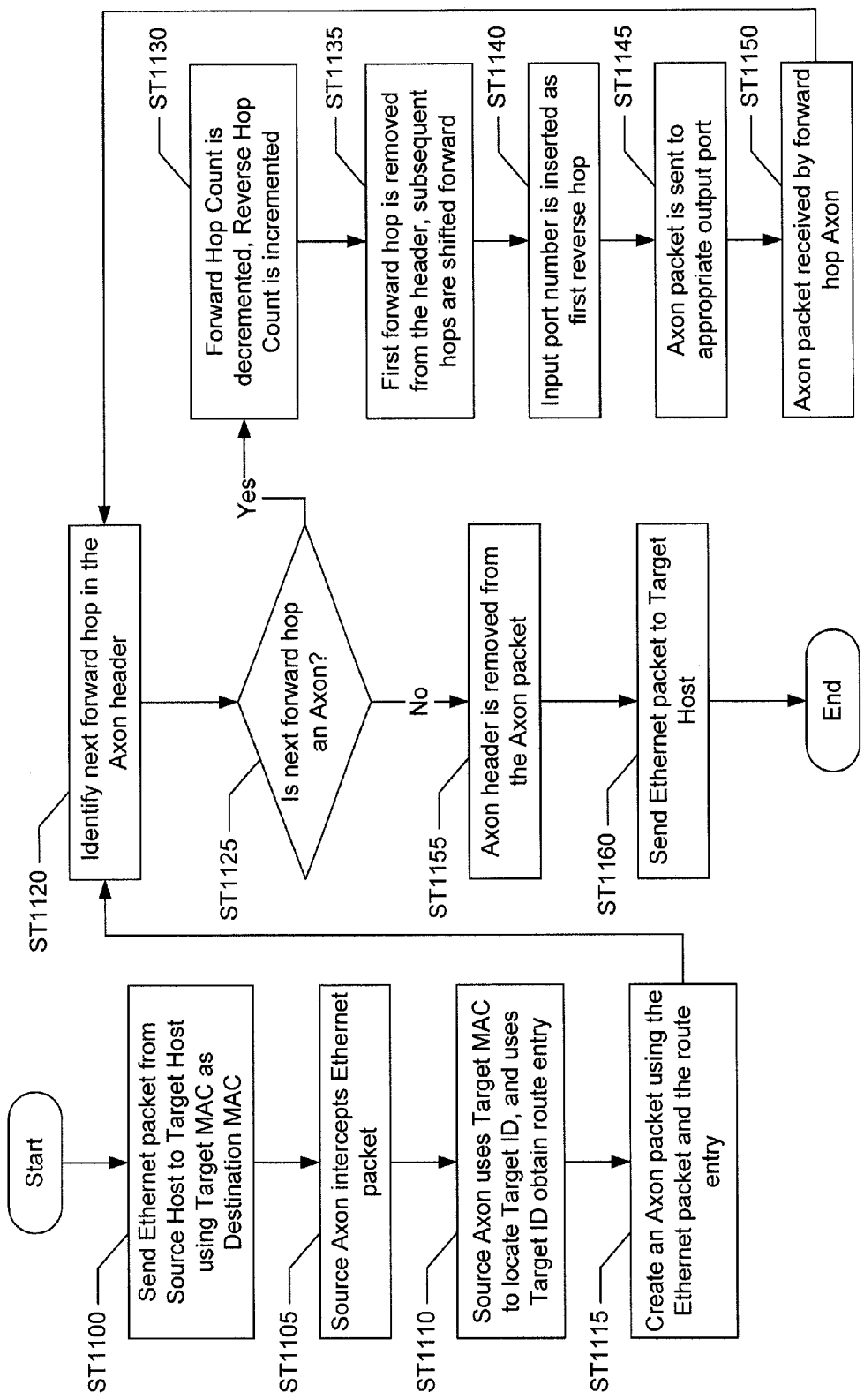
FIG. 11 shows a flow chart in accordance with one or more embodiments of the invention.

FIG. 11 shows a flowchart in accordance with one or more embodiments of the invention. Specifically, FIG. 11 details a method for sending Ethernet packets from a source host to a target host across an Axon network after the routes have been set up and indexed using CAMs, as shown in FIG. 9. Because an Axon network allows hosts across an Axon network to interact with each other as if they were located on the Ethernet network, the Ethernet packets are encapsulated into an Axon packet prior to traversing an Axon network. Similarly, the Ethernet packets are extracted from the Axon packet prior to being transmitted to the target host.

While the various steps in this flowchart are presented and described sequentially, one of ordinary skill will appreciate that some or all of the steps may be executed in different orders, may be combined or omitted, and some or all of the steps may be executed in parallel.

At ST1100, a source host sends an Ethernet packet to a target host. Those skilled in the art will appreciate that an Ethernet packet includes a destination MAC address, a source MAC address, and data. This Ethernet packet includes the actual target MAC address as the destination MAC address and the MAC address of the source host as the source. At ST 1105, the Ethernet packet is intercepted by a source Axon. As described above, the source Axon is operatively connected to the source host.

At ST1110, the source Axon obtains a route entry in order to generate an Axon packet and send the Axon packet from the source Axon to a target Axon. According to one or more embodiments of the invention, the source Axon obtains the route entry stored in the Axon memory allocated to the source host using the CAM entry to locate the route entry, indexed as T ID. Then, T ID is used to retrieve the stored route entry. The route entry includes the route from the source Axon to the target Axon. According to one or more embodiments of the invention, the entry also contains the target host MAC address and the perceived sender MAC address, S ID. The route may include one or more hops, wherein each hop is identified in the route by an output port. According to one or more embodiments of the invention, the source Axon uses the route lookup module in the input port on which the Ethernet packet was received to obtain the route entry and generate the Axon packet.

At ST1115, the source Axon creates an Axon packet using the Ethernet packet and the route entry. According to one or more embodiments of the invention, the Axon packet is created by prepending the Axon header (generated using data from the route entry) to the Ethernet packet, such that the Ethernet packet is intact while the Axon packet traverses the Axon network. According to one or more embodiments of the invention, the Axon header may include other fields, such as a forward hop count, a reverse hop count, a reverse route, a packet type, an Axon packet length, etc.

At ST1120, the source Axon identifies the next forward hop in the Axon header. In one embodiment of the invention, the next forward hop identifies an output port on the Axon. According to one or more embodiments of the invention, the next forward hop may be found at the front of the route from the source Axon to the target Axon. According to one or more embodiments of the invention, the header processor module identifies the next forward hop in the Axon header.

At ST1125, a determination is made about whether the output port identified by the next forward hop is connected to another Axon or to a host. As described above, each hop in the route identifies an output port along the route. Accordingly, the source Axon may determine whether this output port is connected to another Axon or to a host.

When the output port identified by the next forward hop is connected to an Axon, then at ST1130, the forward hop count is decremented and the reverse hop count is incremented. Those skilled in the art will appreciate that while managing hop counts in the Axon header may be beneficial, it may not be necessary to implement the invention. According to one or more embodiments of the invention, the header processor module in the Axon manages the hop counts.

At ST1135, the next forward hop (i.e., the output port at the front of the route) is removed from the route and subsequent hops are shifted forward within the route. At ST1140, the identification for the input port of the Axon currently handling the Axon packet is entered as a hop in the reverse path. Those skilled in the art will appreciate that while generating a reverse path may be useful for implementation, it may not be necessary to implement the invention.

At ST1145, the Axon packet is sent to the appropriate output port as determined by the next forward hop in the route. According to one or more embodiments of the invention, the Axon packet is sent through a switch in the Axon before arriving at the output port. At ST1150, the output port sends the Axon packet to the next Axon via the appropriate layers in the Axon. According to one or more embodiments of the invention, the Axon packet is sent using point-to-point Ethernet. The process then proceeds to ST1120.

When the output port identified in next forward hop is not connected to an Axon, the process proceeds to ST1155. At ST1155, the Axon header is removed from the Axon packet. According to one or more embodiments of the invention, when the next forward hop is a port connected to a host, then the Axon currently handling the Axon packet is connected to the target host. According to one or more embodiments of the invention, removing the Axon header from the Axon packet results in the Ethernet packet sent in ST1100. At ST1160, the Ethernet packet is sent to the target host via the output port specified in the route of the Axon packet received by the Axon in ST1120.

Figure 12:
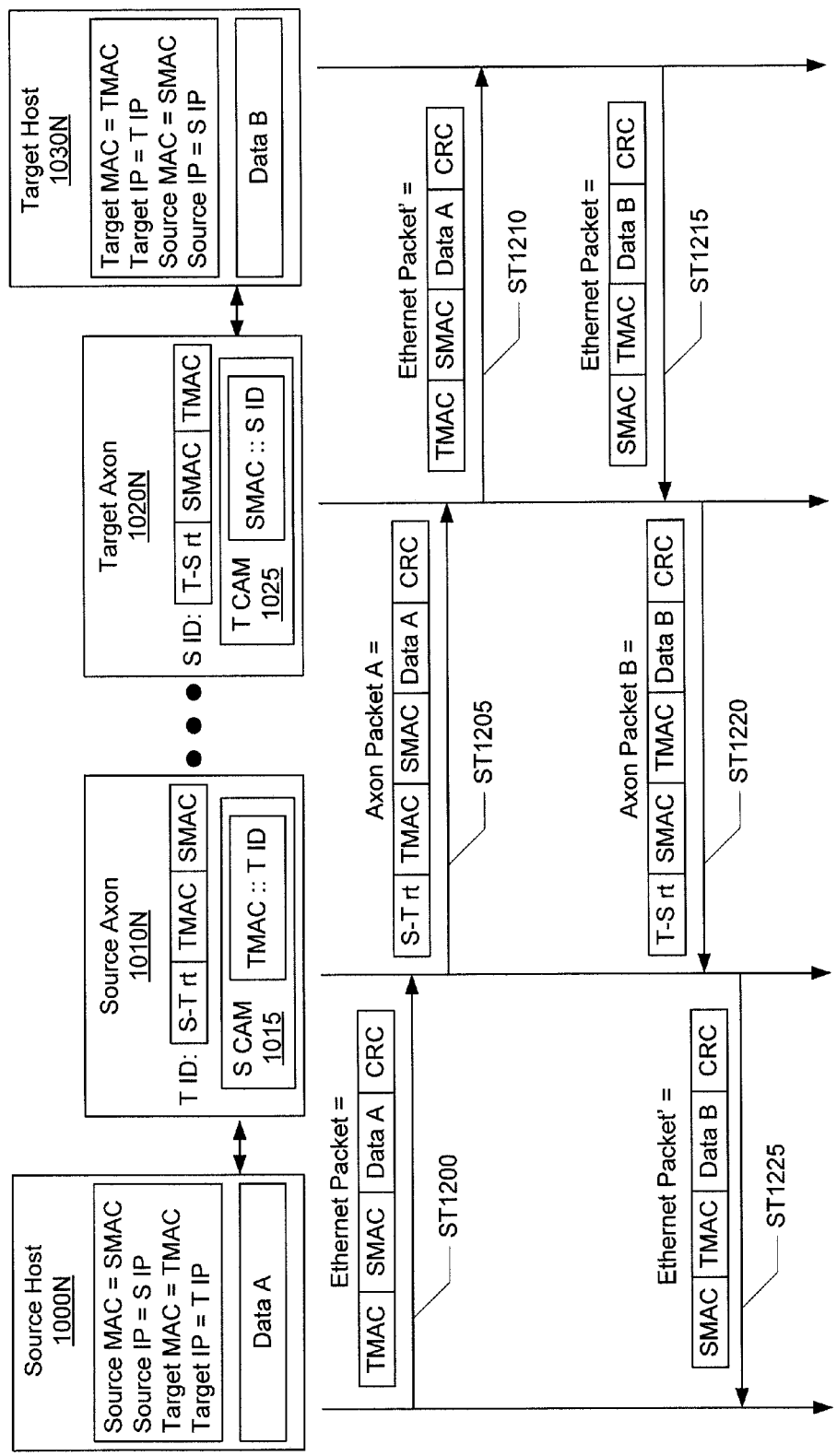
FIG. 12 shows an example in accordance with one or more embodiments of the invention.

FIG. 12 shows an example according to one or more embodiments of the invention. The example is not intended to limit the scope of the invention. Specifically, FIG. 12 shows an example of data traversing an Axon network from a source host to a target host using a CAM implementation. Specifically, FIG. 12 shows a source host (1000N) sending data, Data A, to a target host (1030N). FIG. 7 also shows the target host (1030N) sending data, Data B, to the source host (1000N). The states of the components (1000N, 1010N, 1020N, and 1030N) correspond to the states of the components after the ARP request and ARP reply have been completed pursuant to the example in FIG. 10.

Referring to FIG. 12, at ST1200, the source host (1000N) sends an Ethernet packet to the target host (1030N) that includes Data A. Those skilled in the art will appreciate that the Ethernet packet shown is simplified for purposes of this example and may not include all components of an actual Ethernet packet. The Ethernet packet shown includes a destination address ("TMAC"), a source address ("SMAC"), the data being transported ("Data A"), and a cyclic redundancy check entry ("CRC"). Those skilled in the art will appreciate that while the cyclic redundancy check entry is designated as "CRC" throughout the example, the value of the CRC will be modified after each hop along the route.

Upon receiving the Ethernet packet, the source Axon (1010N) generates an Axon packet that encapsulates the Ethernet packet. According to one or more embodiments of the invention, the route lookup module in the input port of the source Axon generates the Axon packet. In this example, the CAM entry (1015) for TMAC is used to identify that T ID is the index for the route entry. T ID is used to obtain the route entry, which includes the route from the source Axon to the target Axon. Using the route ("S-T rt") and other data from the route entry, the Axon packet is generated, where the Axon header includes route and other fields (not shown) such as a forward hop count, reverse hop count, packet type, packet length, reverse route, etc. The Axon header is then prepended to the front of the Ethernet packet to generate Axon packet A.

Once the Axon packet A has been generated, the source Axon processes the Axon header. According to one or more embodiments of the invention, the Axon header is processed by the header processor module in the input port of the source Axon. The source Axon identifies the next forward hop in the Axon header. The next forward hop is located at the front of the route. A determination is then made about whether the identified next forward hop is another Axon or to a host. As described above, each hop in the route identifies an output port along the route. Accordingly, the source Axon may determine whether this output port is connected to another Axon or to a host. In the example shown, the next forward hop is the target Axon (1020N), although in other implementations the Axon packet may traverse any number of intermediate Axons prior to reaching the target Axon (1020N). At ST1205, the source Axon (1010N) sends the Axon packet to the target Axon (1020N).

Upon receiving Axon packet A, the target Axon (1020N) processes the Axon header. According to one or more embodiments of the invention, the Axon header is processed by the header processor module in the input port which received Axon packet A in the target Axon (1020N). According to one or more embodiments of the invention, the header processor in the Axon identifies the next forward hop. In this case, the next hop would be an output port associated with the target host (1030N). Because the next forward hop is a host, the Ethernet packet is extracted from Axon packet A. More specifically, the Axon header is removed from Axon packet A to obtain an Ethernet packet. After the Ethernet packet has been modified, at ST710, the Ethernet packet is sent to the target host (1030N).

As shown in FIG. 12, the Ethernet packet sent from the source host (1000N) at ST1200, and the Ethernet packet received at the target host (1030N) at ST1210 are identical. Those skilled in the art will appreciate that using CAM entries allows for the original Ethernet packet to remain intact as it traverses the Axon network.

Returning to the example, at a later point in time, the target host (1030N) sends data ("Data B") to the source host (1000N). It is important to note that although the target host (1030N) is acting as a source in this portion of the example, the original descriptions are kept for purposes of this example.

At ST1210, the target host (1030N) sends an Ethernet packet toward the source host (1000N) including Data B. Those skilled in the art will appreciate that the Ethernet packet shown is simplified for purposes of this example and may not include all components of an actual Ethernet packet. The Ethernet packet shown includes a destination address ("SMAC"), a source address ("TMAC"), the data being transported ("Data B"), and a cyclic redundancy check entry (CRC) for the packet.

Upon receiving the Ethernet packet, the target Axon (1020N) generates an Axon packet that encapsulates the Ethernet packet in the same manner as described above with respect to source Axon (1010N). Specifically, the CAM entry for SMAC (1025) is used to identify that S ID is the index for the route entry. S ID is used to obtain the route entry, which includes the route ("T-S rt") from the target Axon (1020N) to the source Axon (1010A). Using the route entry, the Axon packet is generated, where the Axon header includes route and other fields (not shown) such as a forward hop count, reverse hop count, packet type, packet length, reverse route, etc. The Axon header is then prepended to the front of the modified Ethernet packet to generate Axon packet B.

Once the Axon packet B has been generated, the target Axon (i.e., 1020N) processes the Axon header. According to one or more embodiments of the invention, the Axon header is processed by the header processor module in the input port of the target Axon (1020N). Specifically, the next forward hop in the Axon header is identified. A determination is then made about whether the identified next forward hop is another Axon. In the example shown, the next forward hop is the source Axon (1010N), although in other implementations the Axon packet may traverse any number of intermediate Axons prior to reaching the source Axon (1010N). At ST1220, the target Axon (1020N) sends the Axon packet to the source Axon (1010N) via the output port identified in the route.

Upon receiving Axon packet B, the source Axon (1010N) processes the Axon header. According to one or more embodiments of the invention, the Axon header is processed by the header processor module in the input port which received Axon packet B in the source Axon (1000N). According to one or more embodiments of the invention, the header processor in the Axon identifies the next forward hop. In this case, the next hop is an output port associated with the source host (1000N). Because the next forward hop is a host, the Ethernet packet is extracted from Axon packet B. More specifically, the Axon header is removed from Axon packet B to obtain an Ethernet packet. After the Ethernet packet has been modified, at ST1225, the Ethernet packet is sent to the source host (1000N).

While the above examples have described packet flow throughout an Axon network in general terms, FIG. 13 provides a more specific example. Specifically, FIG. 13 is a flow diagram showing a packet traversing an Axon network, detailing the state of the packet as it is transmitted through the Axon network. Those skilled in the art will appreciate that the following example is merely one implementation of the invention and is not intended to limit the scope of the claimed invention.

Referring to FIG. 13, the components of the Axon network in this example include a source host (1300), a source Axon (1305), an intermediate Axon (1310), a target Axon (1315), and a target host (1320). The example describes a data packet sent from the source host (1300) to the target host (1320) across the series of Axons.

As discussed above, packets are transported across an Axon network using input ports and output ports located in each Axon. According to one or more embodiments of the invention, each Axon may include the components described in FIG. 2 and FIG. 3. However, for purposes of this example, only the ports used in the example are shown.

Turning to the example, consider a scenario in which the source host (1300) and the target host (1320) have performed the ARP-request/ARP-reply described in FIG. 10. After the ARP-request/ARP-reply is completed, the source host (1300) proceeds to send a packet to the target host (1320). Initially, the source host (1300) generates an Ethernet packet (1325) to send to the target host (1320). The Ethernet packet (1325) in this example includes a destination address ("TMAC", the actual target MAC address), a source address ("SMAC", the source host MAC address), a packet type ("ET", representing the Ethernet Type, which identifies the type and protocol of the payload of the Ethernet packet, e.g., IP), a collection of data ("Data A"), and a CRC for the packet. At ST1355, Ethernet packet (1325) is transmitted to the source Axon (1305).

Upon receiving the Ethernet packet (1325) at Input Port 1, the source Axon proceeds to encapsulate the Ethernet packet (1325) in an Axon packet (1330). As described above, the source Axon obtains the route entry stored in the source Axon (1305) using the TMAC CAM entry to identify that T ID is the index for the route entry. Thus, T ID is used to obtain the route entry. The route entry is subsequently used to generate the Axon header.

In this example, the Axon packet (1330) includes the following fields in the header: (i) packet type—Axon, (ii) packet length—L, (iii) forward hop count—3, reverse hop count—0, (iv) the route—3:4:7, the reverse route—n (which signifies null for purposes of this example), and padding for implementation purposes. The second part of the Axon packet is an Ethernet packet, which includes the destination address ("TMAC"), source address ("SMAC"), the data packet ("Data A"), and a CRC for the packet. Those skilled in the art will appreciate that presence of a given field, the order to the fields, and the values listed in the fields are for exemplary purposes only and are not intended to limit the scope of the invention.

In this example, the forward hop count denotes the number of hops remaining for the packet to reach the destination. The reverse hop count in the Axon packet (1330) denotes the number of hops that have been traversed in the route. Further, the route includes a list of output ports the Axon packet (1330) must traverse to reach its destination and the reverse route in the Axon packet (1330) includes a list of the input ports the Axon packet (1330) has traversed thus far, allowing the Axon packet to reverse its path, if necessary.

Returning to the example, after the Axon packet is generated by the route lookup module located in Input Port 1, the Axon packet is processed by the header processor module in Input Port 1. Specifically, the header processing module determines the next forward hop from the route (i.e., 3) and, using the next forward hop, determines whether the output port identified by the next forward hop is connected to an Axon or a host. In the example, Output Port 3 is connected to another Axon (i.e., intermediate Axon (1310)). The forward hop count is subsequently decremented, the reverse hop count is incremented, the route is updated to remove "3", and the reverse route is updated to include Input Port 1 (i.e., the port on which Ethernet packet (1325) was received). The result of processing the Axon header is the Axon packet (1335). At ST1360, the Axon packet (1335) is sent to Output Port 3 via a switch in the Source Axon (not shown). At ST1365, the Axon packet (1335) is sent, via Output Port 3, to the intermediate Axon (1310).

The Axon packet (1335) arrives at the intermediate Axon (1310) at Input Port 4. Upon arrival, Input Port 4 processes the Axon header. As discussed above, the Axon header (1335) is only processed by the header processor module. The Axon packet (1335) does not need to be processed by the route lookup module as the route was previously determined. The header processor module in Input Port determines that the next forward hop is Output Port 4. Based on this, the intermediate Axon (1310) determines that Output Port 4 is connected to another Axon. The header processor module further processes the Axon header as follows: (i) the forward hop count is decremented, (ii) the reverse hop count is incremented, (iii) the first forward hop is removed from the route and subsequent hops are shifted forward within the route, and (iv) Input Port 4 is entered as a hop in the reverse route. The result of processing the Axon header is the Axon packet (1340). At ST1370, the Axon packet (1340) is sent to Output Port 4 via a switch in the intermediate Axon (not shown). At ST1375, the Axon packet (1345) is sent to the target Axon (1315).

The Axon packet (1340) arrives at the target Axon (1315) at Input Port 5. Upon arrival, Input Port 5 processes the Axon header. Specifically, the header processor module in the target Axon (1315) identifies the next forward hop in the Axon header as Output Port 7 and, based on this, determines that Output Port 7 is connected to a host. According to one or more embodiments of the invention, the target Axon (1315) may proceed to extract Ethernet Packet (1350) from the Axon packet (1340). Alternatively, in one or more embodiments of the invention, the header processor module processes the Axon header a final time to generate a final Axon packet (1345) before generating the Ethernet packet (1350). For purposes of this example, both scenarios are described.

When the target Axon (1315) processes the Axon header a final time to generate a final Axon packet (1345), the forward hop count is decremented and the reverse hop count is incremented, the next forward hop is removed from the route resulting in an empty route field, and Input Port 5 is entered as a hop in the reverse route. The result of processing the Axon header is the Axon packet (1345). The reverse route may then be used to communicate packets across the Axon Network from the target host to the source host.

With respect to extracting the Ethernet packet (1350) from Axon packet (1340), the header processor module removes the Axon header from the Axon packet, leaving an Ethernet packet. The resulting Ethernet packet is Ethernet packet (1350). At ST1385, the Ethernet packet (1350) is sent from the target Axon (1315) to the target host (1320).

Although these two sets of figures (i.e., FIGS. 4-8 and 9-13) show two separate methods for generating route entries and traversing an Axon network, the two may also be used concurrently, according to one or more embodiments of the invention. For example, some routes may be retrieved using the actual target MAC address (via the CAM) while other routes may be obtained using the target identification. As such, in some instances, where a target identification is used as the target MAC address, the CAM mapping will be ignored. In other cases, where a source host knows the actual MAC address of the target host, using the CAM mapping may be necessary to identify the route entry.

According to one or more embodiments of the invention, an Axon may determine whether the route entry was generated with or without CAMs by analyzing the data (i.e., the T ID, S ID, TMAC, SMAC) in the MAC address field of the packet header. In one embodiment of the invention, the aforementioned data includes a locally administered bit which, when set, identifies that the route was generated using source/target identifications in the Axon ARP. Thus, when the bit is set for the above data, the CAM is bypassed, and the data (which corresponds to the T ID is used as the index to identify the route entry. When the bit is not set, then the data, which is the TMAC, is used with the CAM to identify the T ID. The identified T ID is then used to obtain the corresponding route entry.

In one embodiment of the invention, a given Axon may include functionality to address self-congestion (i.e., packets stored in the output port buffers exceed storage capacity of the buffer (or exceed a storage threshold of the buffer). In one embodiment, to prevent self-congestion, the Axon may issue pause frames to other Axons and hosts upstream from the Axon (i.e., to other Axons and hosts sending packets to the Axon). Upon receipt of the pause frame, the receiving host and/or Axons temporarily stop sending packets to the Axon that issued the pause frame for a duration a time specified in the pause frame. In one embodiment of the invention the aforementioned duration is the amount of time it would take to transmit a maximum-sized packet.

Figure 14:
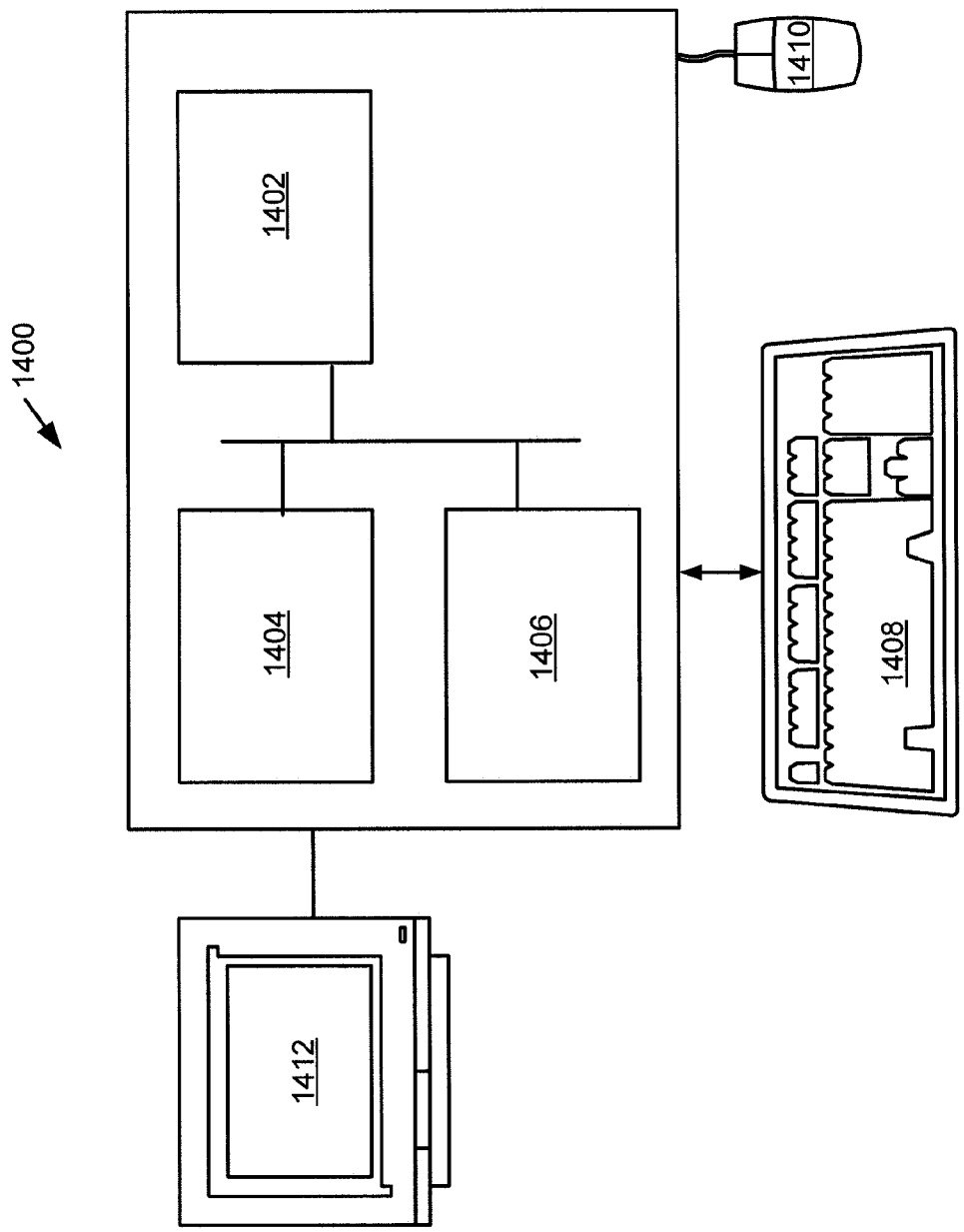
FIG. 14 shows a computer system in accordance with one or more embodiments of the invention.

Embodiments of the invention may be implemented on virtually any type of computer regardless of the platform being used. For example, as shown in FIG. 14, a computer system (1400) includes one or more processor(s) (1402), associated memory (1404) (e.g., random access memory (RAM), cache memory, flash memory, etc.), a storage device (1406) (e.g., a hard disk, an optical drive such as a compact disk drive or digital video disk (DVD) drive, a flash memory stick, etc.), and numerous other elements and functionalities typical of today's computers (not shown). The computer (1400) may also include input means, such as a keyboard (1408), a mouse (1410), or a microphone (not shown). Further, the computer (1400) may include output means, such as a monitor (1412) (e.g., a liquid crystal display (LCD), a plasma display, or cathode ray tube (CRT) monitor). The computer system (1400) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1400) includes at least the minimal processing, input, and/or output means necessary to practice embodiments of the invention.

Further, those skilled in the art will appreciate that one or more elements of the aforementioned computer system (1400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium comprising computer readable code for data transfer, the computer readable code when executed performs a method, the method comprising:
 receiving a first Ethernet packet from a source host at a first Axon,
  wherein the first Ethernet packet comprises: a first destination, a first source, and data, wherein the first source is a source Media Access Control (MAC) address associated with the source host, and
  wherein the first Axon comprises a route entry, wherein the route entry is indexed by a target identification associated with the target host and comprises a route from the first Axon to a second Axon;

obtaining the route using the first destination, wherein the route specifies a path through an Axon network from the first Axon to the second Axon, wherein the second Axon is operatively connected to the target host, wherein at least one intermediate Axon is interposed between the first Axon and the second Axon, and wherein the first route comprises a plurality of hops, and at least one hop is identified by an output port of the at least one intermediate Axon, wherein the Axon network comprises the first Axon, the second Axon, and the at least one intermediate Axon;

generating an Axon packet, wherein the Axon packet comprises the route and a reverse route, wherein the reverse route specifies an input port of the first Axon at which the first Ethernet packet was received, and wherein the reverse route is generated as the Axon packet traverses the path through the Axon network, and wherein the reverse route specifies an input port of each Axon in the path through which the Axon packet passes along the path; and sending the Axon packet to the second Axon using the route.

2. The non-transitory computer readable storage medium of claim 1, wherein generating the Axon packet comprises:
replacing, in the first Ethernet packet, the first destination with a second destination, and the first source with a second source to obtain a second Ethernet packet,
wherein the first destination is the target identification,
wherein the second destination is a target MAC address associated with the target host, and
wherein the second source is a source identification associated with the source host; and
prepending the route and the reverse route to the second Ethernet packet to obtain the Axon packet.

3. The non-transitory computer readable storage medium of claim 2, wherein the second Axon is configured to:
extract the second Ethernet packet from the Axon packet, and
send the second Ethernet packet to the second host.

4. The non-transitory computer readable storage medium of claim 1, wherein the first destination is a MAC address associated with the target host.

5. The non-transitory computer readable storage medium of claim 4, wherein the Axon comprises a content-addressable memory (CAM) configured to map the target MAC address to a target identification corresponding to the target host.

6. The non-transitory computer readable storage medium of claim 5, wherein generating the Axon packet comprises:
identifying the target identification using the first destination and the CAM;
obtaining a route using the target identification; and
prepending the route and the reverse route to the first Ethernet packet.

7. The non-transitory computer readable storage medium of claim 6, wherein the second Axon is configured to:
extract the first Ethernet packet from the Axon packet, and
send the first Ethernet packet to the target host.

8. An Axon, comprising:
a processor;
a route lookup module, when executed by the processor, is configured to:
receive an Ethernet packet from a source host directed to a target host,
wherein the Ethernet packet comprises: a first destination, a first source, and data, wherein the first source is a source Media Access Control (MAC) address associated with the source host;
obtain a route from the Axon to the second Axon using the first destination,
wherein the second Axon is operatively connected to the target host,
wherein the route is stored in a route entry,
wherein the route entry is indexed by a target identification associated with the target host,
wherein the route comprises a plurality of hops,
wherein each of the plurality of hops is identified by an output port of one of a plurality of Axons, and
wherein the plurality of Axons comprises the Axon, the second Axon, and an intermediate Axon;
generate an Axon packet using the route and the Ethernet packet, wherein the Axon packet comprises the route; and
a header processor module, that, when executed by the processor, is configured to:
receive the Axon packet;
determine an output port for a next forward hop using the route, wherein the next forward hop is one of the plurality of hops;
determine whether the output port identified by the next forward hop is connected to the target host,
when the output port identified by the next forward hop is connected to the target host, the header processor module is configured to:
extract the Ethernet packet from the Axon packet, and
send the Ethernet packet to the second host; and
when the output port identified by the next forward hop is connected to the intermediate Axon interposed between the Axon and the second Axon, the header processor module is configured to:
update the route and update the reverse route in the Axon packet to obtain an updated Axon packet, wherein the route in the updated Axon packet does not include the output port for the next forward hop, and wherein the reverse route in the Axon packet includes an input of the Axon at which the Ethernet packet was received, and
send the updated Axon packet, via the switch in the Axon, the output port.

9. The Axon of claim 8, wherein the Axon comprises a plurality of input ports and a plurality of output ports.

10. The Axon of claim 9, wherein the route lookup module and the header processor module are associated with an input port of the plurality of input ports on which the Ethernet packet was received.

11. The Axon of claim 8, wherein the source identification is in a MAC address format.

12. The Axon of claim 8, wherein the target identification is in a MAC address format.

13. The Axon of claim 8, wherein generating the Axon packet comprises:
replacing, in the Ethernet packet, the first destination with a second destination, and the first source with a second source to obtain a second Ethernet packet,
wherein the first destination is the target identification,
wherein the second destination is a target MAC address associated with the target host, and
wherein the second source is a source identification associated with the source host;
combining the route with the second Ethernet packet; and
combining the reverse route with the second Ethernet packet.

14. The Axon of claim 8, wherein the first destination is a target MAC address associated with the target host.

15. The Axon of claim 14, wherein the Axon comprises a content-addressable memory (CAM) configured to map the target MAC address to the target identification.

16. The Axon of claim 15, wherein generating the Axon packet comprises:
   identifying the target identification using the first destination and the CAM; and
   obtaining the route using the target identification.

* * * * *